US009610534B1

(12) United States Patent
Thompson

(10) Patent No.: US 9,610,534 B1
(45) Date of Patent: Apr. 4, 2017

(54) PROCESS FOR GAS SEPARATIONS USING ZEOLITE SSZ-13

(71) Applicant: Chevron U.S.A. Inc., San Ramon, CA (US)

(72) Inventor: Joshua Allen Thompson, Martinez, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/849,657

(22) Filed: Sep. 10, 2015

(51) Int. Cl.
*B01D 53/047* (2006.01)
*B01J 20/18* (2006.01)

(52) U.S. Cl.
CPC .......... *B01D 53/0476* (2013.01); *B01J 20/18* (2013.01); *B01D 2253/108* (2013.01); *B01D 2256/24* (2013.01); *B01D 2256/245* (2013.01); *B01D 2257/304* (2013.01); *B01D 2257/504* (2013.01); *B01D 2259/4003* (2013.01); *B01D 2259/404* (2013.01); *B01D 2259/40018* (2013.01);
(Continued)

(58) Field of Classification Search
CPC .............. B01D 53/047; B01D 53/0476; B01D 2252/108; B01D 2256/24; B01D 2256/245; B01D 2257/304; B01D 2257/504; B01D 2259/40018; B01D 2259/403; B01D 2259/40041; B01D 2259/40049; B01D 2259/404; B01D 2259/41; B01J 20/18
USPC ..... 95/96–98, 100–102, 135, 136, 139, 902; 423/230
See application file for complete search history.

(56) References Cited

U.S. PATENT DOCUMENTS 4,544,538 A   10/1985   Zones
4,925,460 A   5/1990   Coe et al.
(Continued)

OTHER PUBLICATIONS

Matthew R. Hudson, Wendy L. Queen, Jarad A. Mason, Dustin W. Fickel, Raul F. Lobo, and Craig M. Brown; Unconventional, Highly Selective CO2 Adsorption in Zeolite SSZ-13; *Journal of the American Chemical Society* 2012 134 (4), 1970-1973.
(Continued)

*Primary Examiner* — Frank Lawrence
(74) *Attorney, Agent, or Firm* — Susan M. Abernathy; Karen R. DiDomenicis

(57) ABSTRACT

Disclosed are methods for removing acid gas from a feed stream of natural gas including acid gas, methane and ethane. The methods include alternating input of the feed stream between at least two beds of adsorbent particles comprising zeolite SSZ-13 such that the feed stream contacts one of the at least two beds at a given time in an adsorption step and a tail gas stream is simultaneously vented from another of the at least two beds in a desorption step. The contact occurs at a feed pressure of from about 50 to about 1000 psia for a sufficient period of time to preferentially adsorb acid gas from the feed stream. A product gas stream is produced containing no greater than about 2 mol % carbon dioxide and at least about 65 mol % of methane recovered from the feed stream and at least about 25 mol % of ethane recovered from the feed stream. The feed stream is input at a feed end of each bed. The product gas stream is removed from a product end of each bed. The tail gas stream is vented from the feed end of each bed. The methods require lower vacuum power consumption and allow improved hydrocarbon recoveries compared with known methods.

18 Claims, 28 Drawing Sheets

(52) U.S. Cl.
CPC .............. *B01D 2259/40041* (2013.01); *B01D 2259/40049* (2013.01); *B01D 2259/41* (2013.01)

(56) References Cited

U.S. PATENT DOCUMENTS

| | | | |
|---|---|---|---|
| 6,068,682 | A | 5/2000 | Kuznicki et al. |
| 6,488,741 | B2 | 12/2002 | Olson |
| 6,497,750 | B2 | 12/2002 | Butwell et al. |
| 6,500,234 | B1 | 12/2002 | Ackley et al. |
| 6,709,644 | B2 | 3/2004 | Zones et al. |
| 8,557,026 | B2 * | 10/2013 | Kuipers ................. B01D 53/02 95/117 |
| 8,926,735 | B1 | 1/2015 | Xie et al. |
| 2011/0311441 | A1 * | 12/2011 | Miller .................... C01B 37/02 423/704 |
| 2016/0175759 | A1 * | 6/2016 | Carstensen ............ B01D 53/04 95/96 |

OTHER PUBLICATIONS

Luberti, M, Friedrich, D, Brandani, S & Ahn, H 2014, 'Design of a H2 PSA for cogeneration of ultrapure hydrogen and power at an advanced integrated gasification combined cycle with pre-combustion capture' *Adsorption*, vol. 20, No. 2-3, pp. 511-524.

\* cited by examiner

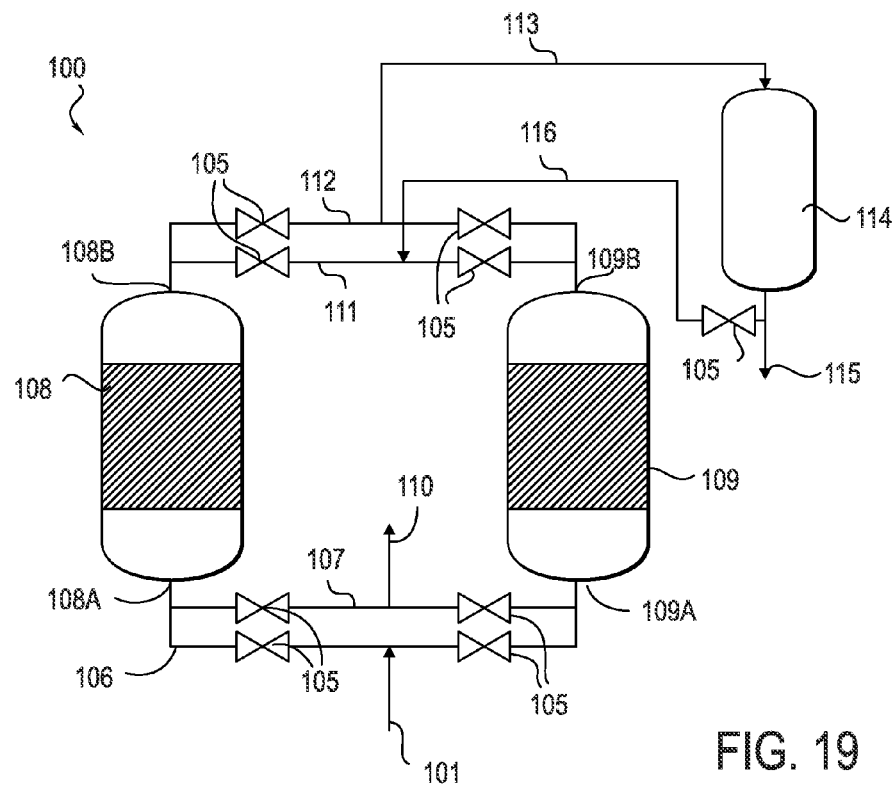
FIG. 19
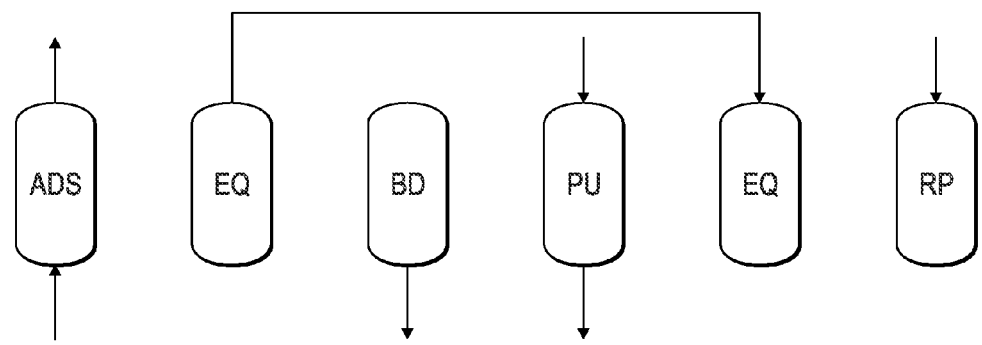
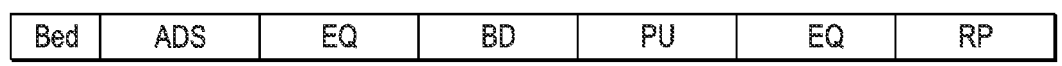
FIG. 20

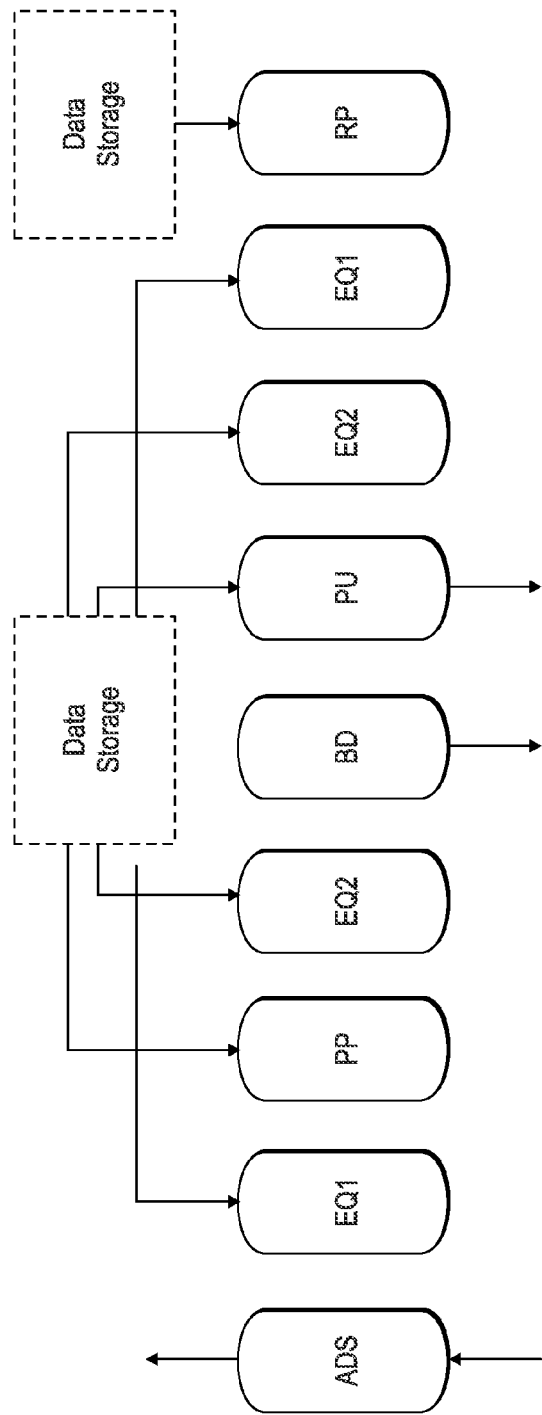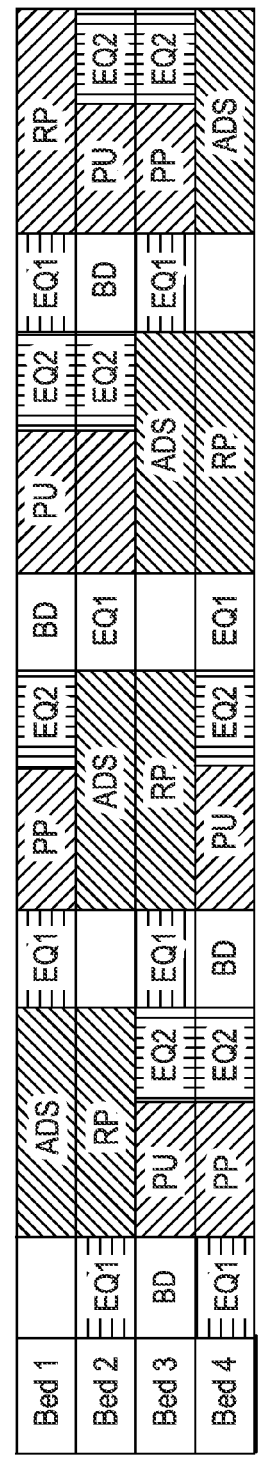
FIG. 22

PROCESS FOR GAS SEPARATIONS USING ZEOLITE SSZ-13

FIELD

The present disclosure relates to methods for treating methane-containing gas mixtures involving the use of adsorbent zeolite particles to adsorb acid gases from the gas mixtures.

BACKGROUND

Natural gas typically requires treatment to remove acid gas contamination including carbon dioxide ($CO_2$) and hydrogen sulfide ($H_2S$) before utilization of the natural gas. As natural gas production continues to grow in remote areas and in gas fields containing acid gases, there is a need to treat natural gas produced from these fields using efficient methods to remove such contaminants. To treat acid gases, aqueous amine absorption is the standard technology because of high recovery of hydrocarbons and efficient energy use. However, amine absorption technology may not be feasible or practical when treating natural gas at the well head or at low flow rates. Amine absorption technology has issues associated with handling solvents required for regeneration, and has poor economics in remote or offshore locations. Practical use of amine absorption technology would require absorption of acid gases at mild temperatures, heating the solvent to high temperatures to remove the acid gases in a stripping tower, and subsequent cooling of the solvent to return to the absorption unit. The natural gas product from the amine unit further requires a dehydration step to remove water for dew point control.

Pressure-swing adsorption (PSA) technology is an alternative technology for treating natural gas that uses a solid adsorbent material to remove acid gases. PSA technology operates by using an adsorbent material that removes a target adsorbate molecule from a gas mixture by preferential adsorption over other species in the gas mixture. Adsorption processes that remove $CO_2$ from gas streams typically use zeolite- or carbon-based adsorbent materials. The adsorbent can either function by equilibrium (thermodynamics) or kinetic (rate-based) separations. In principle, all adsorption processes utilize at least two steps: adsorption or uptake of the target molecule in the adsorbent; and desorption or removal of that same target molecule from the adsorbent. This may be achieved by changes in concentration, pressure, or temperature. In the case of PSA and vacuum-swing adsorption (VSA), pressure changes are used to regenerate the adsorbent. PSA does not require a dehydration step. PSA technology is able to treat natural gas containing acid gases without the need for on-site solvent regeneration and other issues associated with amine units.

It would be desirable to have a PSA process utilizing an adsorbent material which would require lower vacuum power consumption and which would allow improved hydrocarbon recoveries as compared with known processes. Such a process would enable deployment and competitive use of PSA units for natural gas separations in expanded applications.

SUMMARY

In one aspect, a method is provided for removing acid gas from a feed gas stream of natural gas including acid gas, methane and ethane. The method includes alternating input of the feed gas stream between at least two beds of adsorbent particles comprising zeolite SSZ-13 such that the feed gas stream contacts one of the at least two beds at a given time in an adsorption step and a tail gas stream is simultaneously vented from another of the at least two beds in a desorption step. The contact occurs at a feed pressure of from about 50 to about 1000 psia for a sufficient period of time to preferentially adsorb acid gas from the feed gas stream. A product gas stream is produced containing no greater than about 2 mol % carbon dioxide and at least about 65 mol % of methane recovered from the feed gas stream and at least about 25 mol % of ethane recovered from the feed gas stream. The feed gas stream is input at a feed end of each bed. The product gas stream is removed from a product end of each bed. The tail gas stream is vented from the feed end of each bed.

DESCRIPTION OF THE DRAWINGS

These and other objects, features and advantages of the present invention will become better understood with reference to the following description, appended claims and accompanying drawings where:

FIGS. 19 and 20 are a schematic diagram illustrating a two bed PSA system and a corresponding bed interaction scheme, respectively, according to one exemplary embodiment.

FIGS. 21 and 22 are a schematic diagram illustrating a four bed PSA system and a corresponding bed interaction scheme, respectively, according to one exemplary embodiment.

DETAILED DESCRIPTION

Figure 1:
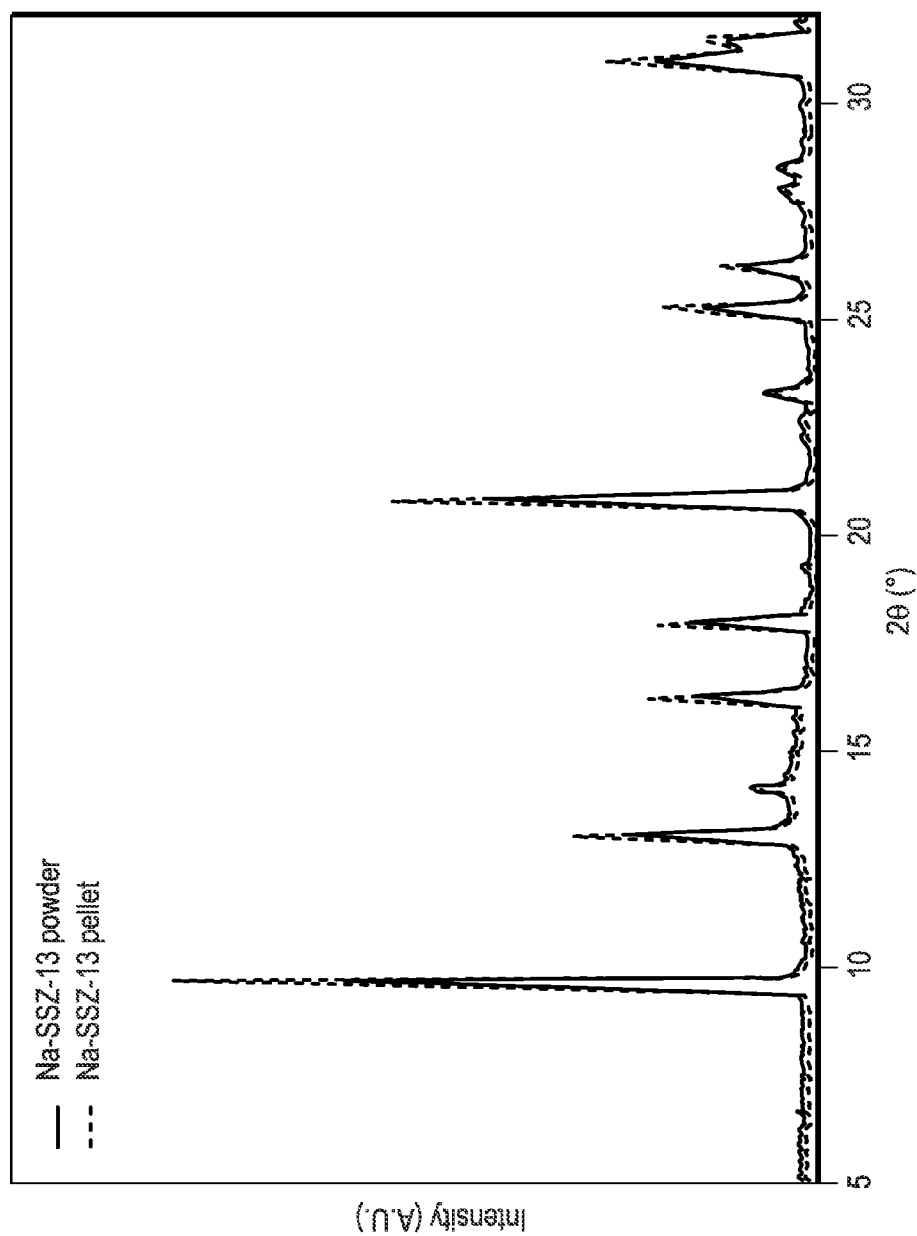
FIG. 1 is a plot comparing XRD patterns of samples of Na-SSZ-13 pellets with Na-SSZ-13 powder.

The methods of the present disclosure use SSZ-13 zeolite particles as an adsorbent material in a PSA process for removing acid gas from natural gas streams. The acid gas can include carbon dioxide ($CO_2$), hydrogen sulfide ($H_2S$), carbonyl sulfide (COS), combinations thereof, and combinations thereof with water ($H_2O$). In one embodiment, the amount of hydrogen sulfide in the feed gas stream is from 0 to 1000 ppm.

SSZ-13 is a synthetic chabazite (a CHA type zeolite), described more fully in U.S. Pat. No. 4,544,538, issued Oct. 1, 1985 to Zones, the contents of which are incorporated herein by reference. A method for preparing SSZ-13 is disclosed in U.S. Pat. No. 8,007,764 (Miller et al.), the contents of which are incorporated herein by reference. In one embodiment, the SSZ-13 has a ratio of silica to alumina (also referred to as Si:Al ratio) of from 5 to 100. In one embodiment, the zeolite SSZ-13 has a cation as a framework ion. Suitable cations can include sodium, calcium, potassium, lithium, magnesium, and barium. In one embodiment, the cation is a sodium cation.

In one embodiment, acid gas is removed from a feed gas stream of natural gas including acid gas, methane and ethane. In one embodiment, the feed gas stream is alternately input between at least two beds of adsorbent particles comprising zeolite SSZ-13 such that the feed gas stream contacts one of the at least two beds at a given time. The feed gas stream is input at a feed end of each bed. In one embodiment, the feed gas stream has a flow rate of from 1 to 100 million standard cubic feet per day (MMSCFD) in an adsorption step. The adsorption step can occur at a temperature of from 20 to 80° C.

While the feed gas stream is contacting the adsorbent bed, the adsorbent bed is operating in the adsorption step. A tail gas stream is simultaneously vented from another of the at least two beds in a desorption step. The tail gas stream is vented from the feed end of each bed. The contact of the gas with the adsorbent particles (in the adsorption step) occurs at a feed pressure of from about 50 to about 1000 psia for a sufficient period of time to preferentially adsorb acid gas from the feed gas stream. As feed pressure is increased, the moles of ethane ($C_2H_6$) adsorbed onto the adsorbent per mass of the adsorbent decreases. A principle of PSA operations is that the adsorbent is fed at higher pressures, and the adsorbent bed is regenerated at a lower pressure. In processes using conventional adsorbents, $C_2H_6$ adsorbs more as pressure is increased, and during the desorption step, more $C_2H_6$ is lost because desorption occurs at the lower pressures of desorption. In embodiments of the present disclosure, because $C_2H_6$ adsorbs more at lower pressures, it is not lost in as great a quantity in the tail gas as in processes using conventional adsorbents due to the adsorption behavior of SSZ-13, demonstrated herein experimentally in Example 3. Thus the potential recovery of the heavier hydrocarbon is increased in processes using SSZ-13 as the adsorbent.

A product gas stream is produced as a result of the adsorption step. The product gas stream is removed from a product end of each bed. The product gas stream contains no greater than about 2 mol % carbon dioxide and at least about 65 mol % of methane recovered from the feed gas stream and at least about 25 mol % of ethane recovered from the feed gas stream. In one embodiment, the product gas stream contains methane having a purity of at least about 95 mol % and ethane having a purity of at least about 3 mol % ethane. In one embodiment, the product gas stream contains no greater than about 50 ppm hydrogen sulfide. In one embodiment, the product gas stream contains no greater than about 4 ppm hydrogen sulfide.

In one embodiment, following the adsorption step in one of the at least two beds and simultaneous desorption step in another of the at least two beds, the pressure of the two beds is allowed to equalize. This can be done by means of a line connecting the product ends of the two beds at the end of the adsorption step and simultaneous desorption step. Following the desorption step, the bed having just completed the desorption step is repressurized by first equalizing in pressure with a second bed of at least two beds and then further repressurized by another gas stream. This further repressurization can be done by sending a slipstream of the product gas stream through the product end of the bed having just completed the desorption step. In another embodiment, the further repressurization can be done by utilizing the feed gas through the feed end of the bed having just completed the desorption step.

In one embodiment, two adsorbent beds are used. A PSA system 100 with two beds is shown in FIG. 19 with an adsorption cycle (bed interaction scheme) as shown in FIG. 20. Feed gas 101 is introduced into line 106 having block valves 105 therein. Line 106 connects the feed ends 108A and 109A of adsorption columns 108 and 109, respectively. Line 107 also connects the feed ends 108A and 109A of adsorption columns 108 and 109, respectively, and has an outlet for tail gas 110. Adsorption columns 108 and 109 have product ends 108B and 109B, respectively. Product ends 108B and 109B are connected by lines 111 and 112. Lines 111 and 112 include block valves 105. Line 112 is connected with line 113 which delivers gas to optional product gas buffer tank 114. The product gas buffer tank 114 allows controlled purging and repressurization steps. Product gas 115 can be provided from product gas buffer tank 114 (controlled by a block valve 105) through line 116 to line 111. FIG. 20 illustrates the sequence of steps that each of the adsorption columns cycles through. In one embodiment, adsorption columns 108 and 109 alternate, such that while one adsorption column, column 108, is operating in the adsorption step, the other adsorption column, column 109, is operating in the desorption step. Following the adsorption step in the first bed, the bed having just finished the adsorption step is depressurized through the product end of the bed, line 111, while feeding gas to the second bed having just completed the desorption step through the product end of the bed, line 112. When the pressures have equalized in the two beds, the first bed is then depressurized through the feed end of the bed from about 20 psia to about 1 psia, line 110, and the second bed is simultaneously repressurized using a product gas buffer tank 114 through line 116.

Figure 21:
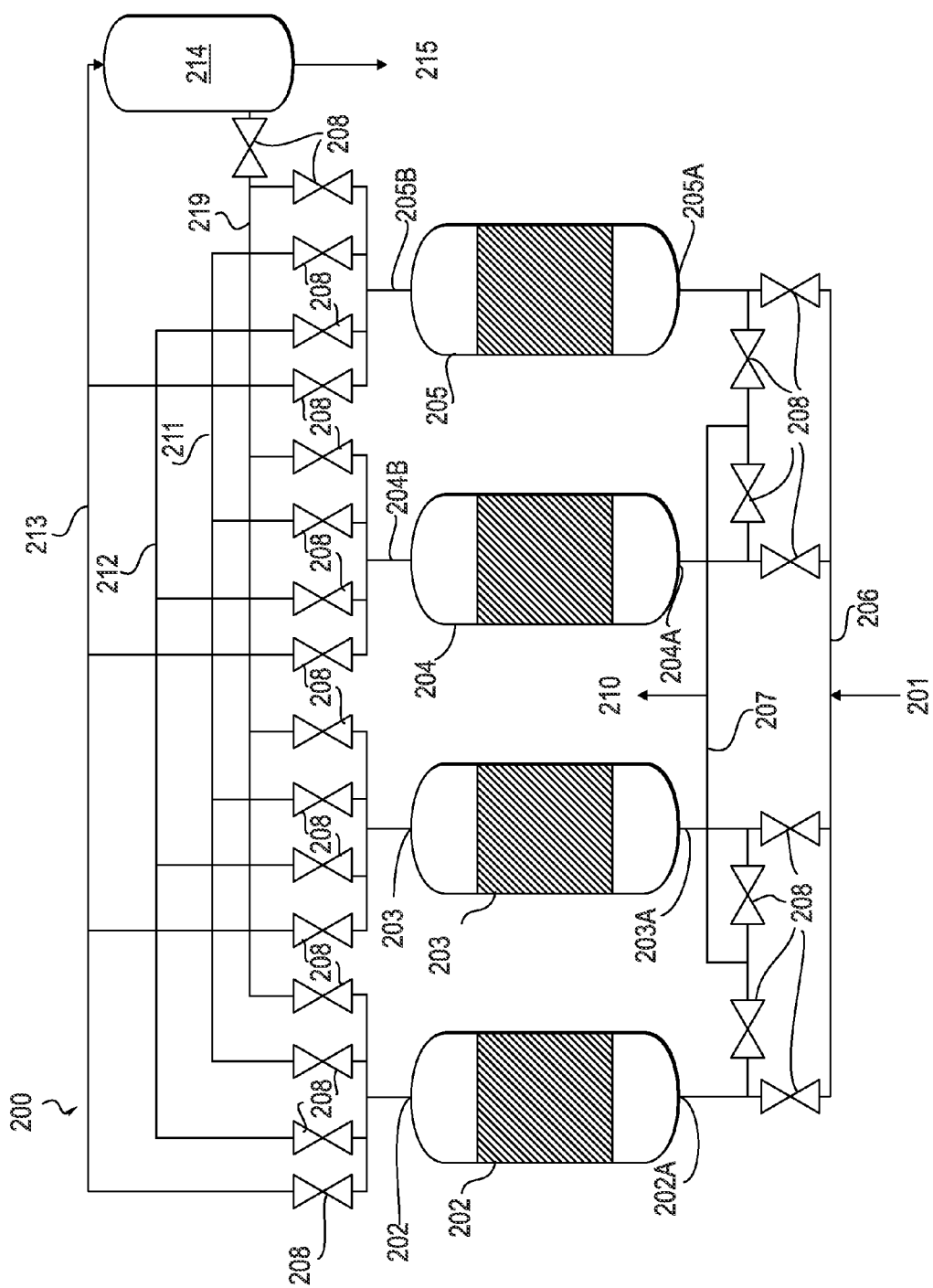

In one embodiment, four adsorbent beds are used and the adsorbent beds are controlled in such a way that each bed cycles through a sequence of operations, also referred to as steps, and the cycles of the four beds are synchronized with respect to one another. FIG. 21 illustrates such a system 200. The operation of system 200 is similar to the operation of the two bed system 100. Feed gas 201 is introduced into line 206 having block valves 208 therein. Line 206 connects the feed ends 202A, 203A, 204A and 205A of adsorption columns 202, 203, 204 and 205, respectively. Line 207 also connects the feed ends 202A, 203A, 204A and 205A of adsorption columns 202, 203, 204 and 205, respectively, and has an outlet for tail gas 210. Adsorption columns 202, 203, 204 and 205 have product ends 202B, 203B, 204B and 205B, respectively. Product ends 202B, 203B, 204B and 205B are connected by lines 209, 211, 212 and 213. Lines connecting product ends 202B, 203B, 204B and 205B with lines 209, 211, 212 and 213 include block valves 208. Lines 209 and 213 are connected with optional product gas buffer tank 214. The product gas buffer tank 214 allows controlled purging and repressurization steps. Product gas 215 can be provided from product gas buffer tank 214 (controlled by a block valve 208).

FIG. 22 illustrates the sequence of steps that each of the four adsorption columns cycles through in an embodiment using the system 200. The cycle of steps that each bed is sequenced through will be described as follows, from the perspective of one of the four beds, arbitrarily designated herein as the "first bed" or "Bed 1." Following a first adsorption step (illustrated as "ADS" in the matrix of FIG. 22) in the first bed, a first equalization step (illustrated as "EQ1" in the matrix) occurs in which the first bed is allowed to equalize in pressure with a second bed of the four beds. The second bed has a lower pressure than the first bed, so that when the two beds equalize, the pressure of the first bed reduces and the pressure of the second bed increases. The equalization can occur through a line connecting the product ends of the first and the second beds.

Following the above-described first equalization step, the pressure in the first bed is lowered and gas is passed from the first bed to a third bed of the four beds through a line connecting the product ends of the first and the third beds. This is referred to as the "providing purge" step ("PP") since the gas purges the third bed.

Following the providing purge step, a second equalization step ("EQ2") occurs in which the first bed is allowed to equalize in pressure with the third bed. The third bed has a lower pressure than the first bed. The pressure of the first and third beds equalizes through a line connecting the product ends of the first and the third beds.

Following the second equalization step, the first adsorbent bed is next depressurized to a pressure of from about 20 to about 1 psia through the feed end of the first adsorbent bed. This is referred to as the blowdown step ("BD") in which gas in the first adsorbent bed is allowed to vent to a purge tank. Alternatively, a vacuum pump can be used to lower the pressure of the first adsorbent bed in this step.

Following the blowdown step, the first bed is purged in a purging step ("PU") in which gas is provided to the first bed through the product end of the first bed from a fourth bed of the four beds while the first bed is at a pressure from about 20 to about 1 psia. Gas is meanwhile purged through the feed end of the first bed during the purging step.

Following the purging step, a third equalization step ("EQ2") occurs in which the first bed is allowed to equalize in pressure with the fourth bed. The fourth bed has a higher pressure than the first bed. The pressure equalization can occur through a line connecting the product ends of the first and the fourth beds.

Following the third equalization step, a fourth equalization step ("EQ1") occurs in which the first bed is allowed to equalize with the second bed which has a higher pressure than the first bed. This equalization step can occur through a line connecting the product ends of the first and the second beds.

Following the fourth equalization step, a slipstream of the product gas is passed through the product end of the first bed to repressurize the first bed to the adsorption step pressure in a repressurization step ("RP").

Following the repressurization step, the first bed is operated in an independent adsorption step (illustrated as a blank box in the matrix) for sufficient time for the third and fourth beds to be equalized in pressure with respect to one another, and for the second bed to be depressurized. After this period of time, a second adsorption step can begin.

The second, third and fourth beds are likewise sequenced to cycle through the above-described adsorption step, first equalization step, providing purge step, second equalization step, blowdown step, purging step, third equalization step, fourth equalization step and independent adsorption step in the same order as the first bed. In one embodiment, the adsorption step, first equalization step, providing purge step, second equalization step, blowdown step, purging step, third equalization step, fourth equalization step and independent adsorption step occur in a total cycle time of from 400 to 3600 seconds, even from 400 to 1600 seconds.

In one embodiment, the product gas stream contains at least about 80 mol % of methane recovered from the feed gas stream and at least about 40 mol % of ethane recovered from the feed gas stream.

In one embodiment, recycle of the waste stream from the blowdown and purge steps can be used to increase the $CH_4$ and $C_2H_6$ recoveries and lower the vacuum and compression costs. Thus processes according to some embodiments are suitable for removing acid gases from natural gas streams in remote or off-shore locations if amine absorption is not a viable alternative for separations.

In some embodiments, the methods of the present disclosure have a specific vacuum power consumption of from about 500 to about 1500 kWhr/MM SCF raw gas.

In some embodiments, from greater than 0% to about 50% of the tail gas stream is recycled to the feed gas stream. As a result, a product gas stream is produced containing no greater than about 2 mol % carbon dioxide and at least about 90 mol % of the methane in the feed gas stream and at least about 85 mol % of the total hydrocarbons in the feed gas stream.

In some embodiments, a method is provided for removing acid gas from a feed gas stream of natural gas that includes methane, ethane, carbon dioxide and from 4 to 1000 ppm hydrogen sulfide. The feed gas stream is alternately input between at least two beds (input at a feed end of each bed) of adsorbent particles comprising zeolite SSZ-13 such that the feed gas stream contacts one of the at least two beds at a given time in an adsorption step and a tail gas stream is simultaneously vented from another of the at least two beds (from the feed end) in a desorption step. The contact occurs at a feed pressure of from about 50 to about 1000 psia for a sufficient period of time to preferentially adsorb acid gas from the feed gas stream. As a result, advantageously, a product gas stream is produced (removed from a product end of each bed) containing no greater than about 2 mol % carbon dioxide, no greater than about 1 ppm $H_2S$, and no greater than about 1 ppm COS. At least about 65 mol % of methane is recovered from the feed gas stream and at least about 25 mol % of ethane is recovered from the feed gas stream.

It should be noted that only the components relevant to the disclosure are shown in the figures, and that many other components normally part of a pressure-swing or vacuum-swing adsorption system are not shown for simplicity.

EXAMPLES

Test Methods

Powder x-ray diffraction (XRD) was performed with Cu X-ray source and measured between 5° and 35° 2-theta (2θ).

BET and t-plot micropore volume were determined by $N_2$ physisorption experiments. The Na-SSZ-13 samples were activated at 400° C. under flowing N₂ gas. The samples were then cooled to −196° C. and uptake of N₂ was measured.

Pellet density was determined by preparing a volumetric solution of water, submerging Na-SSZ-13 pellets of a known mass into the water solution and calculating density based on changes in volume.

The skeletal density determined from crystal structure of CHA was calculated based on the Si:Al ratio and the sodium cation. The unit cell volume and framework density were obtained from the IZA database.

Example 1

Preparation of SSZ-13

Na-SSZ-13 powder was synthesized based on previous procedures to produce a CHA (three letter code standing for chabazite, provided by the International Zeolite Association [IZA]) structure with a Si:Al atomic ratio of 6.8 as described in U.S. Pat. No. 6,709,644 (Zones et al.)). Na-SSZ-13 pellets were prepared by mixing with pseudo-Boehmite alumina powder to achieve 25 wt % alumina, grinding the powders together to create a homogeneous mixture and then pressing pellets at 15,000 psi. The alumina binder provides support to the zeolite pellets. The pellets were broken and sieved to obtain the desired mesh size. Multiple pellets were prepared for use in dynamic column breakthrough (DCB) experiments. The Na-SSZ-13 pellet samples were analyzed for BET and t-plot micropore volume analysis following DCB experiments to confirm the adsorbents are fully regenerable and stable after multiple adsorption experiments.

The powder XRD pattern of the Na-SSZ-13 pellet samples is shown in FIG. 1. The XRD pattern matched the expected CHA structure. The CHA structure remained intact after preparing pellets under a high-pressure pellet press, showing the distinct structural peaks between 5-35° (degrees) 2θ (theta). Table 1 shows the characterization of the Na-SSZ-13 powder, pellet and spent pellet. BET and t-plot MPV reflect typical CHA textural properties for Na-SSZ-13 powder. There was no apparent change in the normalized micropore volume when the amount of binder is taken into account, further confirming the CHA structure remained stable after pellet preparation and exposure to different gases at various feed pressures and activation cycles.

TABLE 1

|  | Na-SSZ-13 Powder | Na-SSZ-13 Pellet | Na-SSZ-13 Spent Pellet |
|---|---|---|---|
| BET Surface Area (m²/g) | 610 | 530 | 530 |
| t-plot MPV (cm³/g) | 0.282 | 0.213 (0.284)ᵃ | 0.214 (0.284)ᵃ |
| Pellet Density (kg/m³) |  | 920 |  |
| Skeletal Density (kg/m³) |  | 1550 |  |

ᵃValues for t-plot MPV in parentheses represented micropore volume normalized to amount of zeolite.

Example 2

Pure Component Equilibrium Adsorption

Equilibrium gas adsorption experiments for $CO_2$, $CH_4$ and $C_2H_6$ were performed on a SETARAM PCTPro 2000 volumetric system (commercially available from SETARAM INSTRUMENTATION, Caluire, France). Equilibrium vapor adsorption experiments for $H_2O$ were performed on a dynamic vapor sorption (DVS) vacuum gravimetric system (commercially available from SURFACE MEASUREMENT SYSTEMS, London, United Kingdom). Na-SSZ-13 samples were first activated at 250° C. to obtain the dry weight and then reactivated in the gas adsorption system. Gases used were $CO_2$, $CH_4$, $C_2H_6$ and He (all 99.999%). The zeolites were tested from 0-30 bar for $CO_2$ and $CH_4$ and 0-3 bar for $C_2H_6$. For vapor experiments, the pressure ranged up to 280 mbar due to the limitation in generating vapor pressure up to 70° C.

Figure 2:
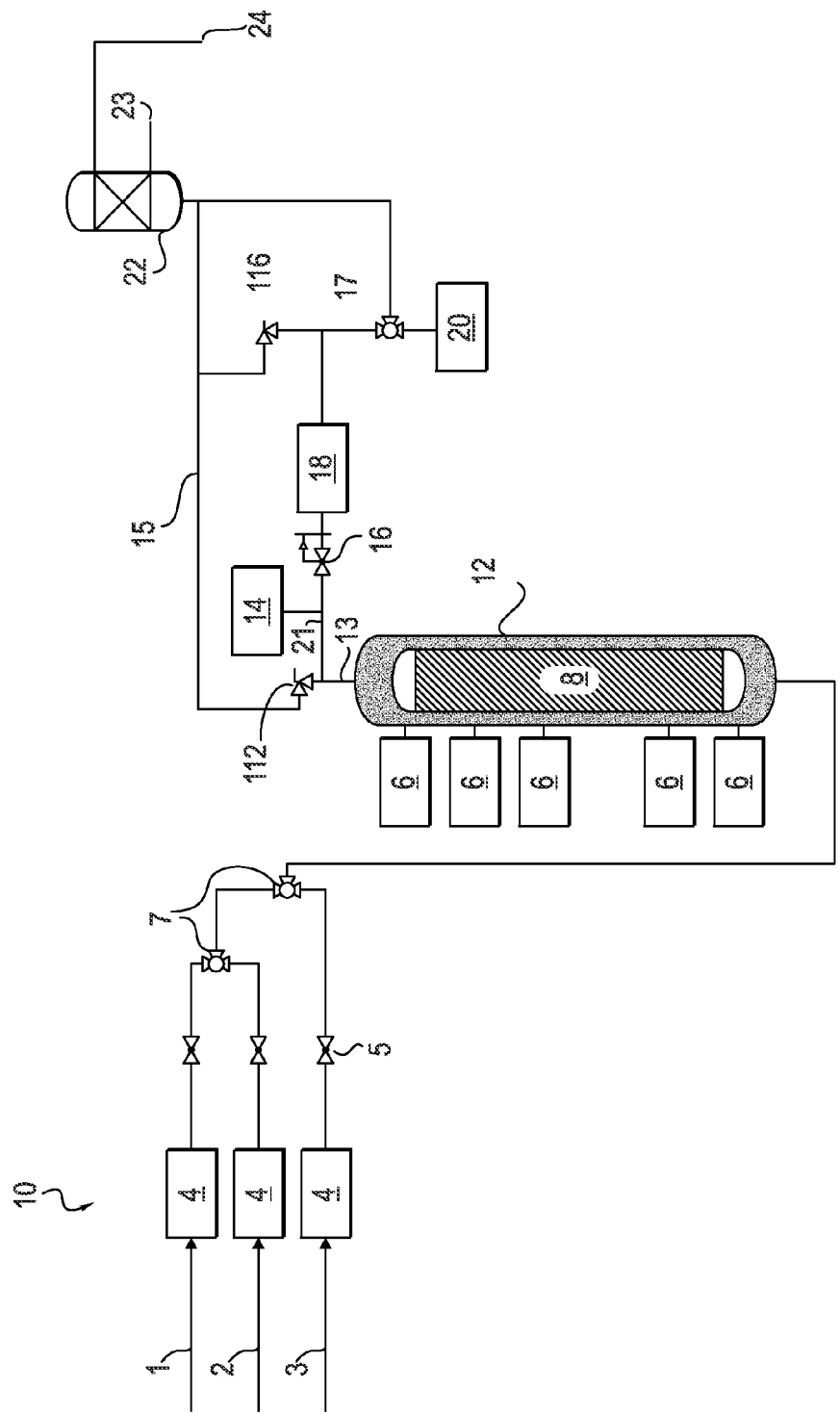
FIG. 2 is a schematic diagram illustrating a dynamic column breakthrough (DCB) apparatus.

For $H_2S$ adsorption measurements, the adsorption capacity was determined by dynamic column breakthrough (DCB) experiments using the DCB apparatus shown in FIG. 2 and described in Example 3. Gas mixtures of 1000 ppm $H_2S$ in helium were fed to Na-SSZ-13 zeolite pellets at 350 cm³ (STP)/min from pressures of 1.6 to 35 bar to obtain isotherms at different $H_2S$ partial pressures. The capacity was determined by calculating the breakthrough time for $H_2S$ by equation (1).

$$\tau_b = \int_0^{t_\infty} \left(1 - \frac{F_{i,o}}{F_{i,f}}\right) dt \quad (1)$$

where Fi is the molar flow rate of the gas component being considered at the outlet, o, and feed, f. To determine the breakthrough capacity, the methodology developed by Malek and Farooq in A. Malek, S. Farooq, "Determination of Equilibrium Isotherms Using Dynamic Column Breakthrough and Constant Flow Equilibrium Desorption", *J. Chem. Eng. Data,* 1996, 41, 25-32 was used. Using the methodology, the capacity is calculated by equation (2).

$$q_b = \frac{C_i}{\rho_p} \frac{\varepsilon_p}{1-\varepsilon_p}\left(\frac{v_i \tau_b}{l} - 1\right) \quad (2)$$

where qb is the breakthrough capacity, Ci is the gas step concentration of component i, ρp is the particle density, εp is the bed void fraction, vi is the interstitial velocity, l is the length of the packed bed and τb is the effective breakthrough time.

Figure 3:
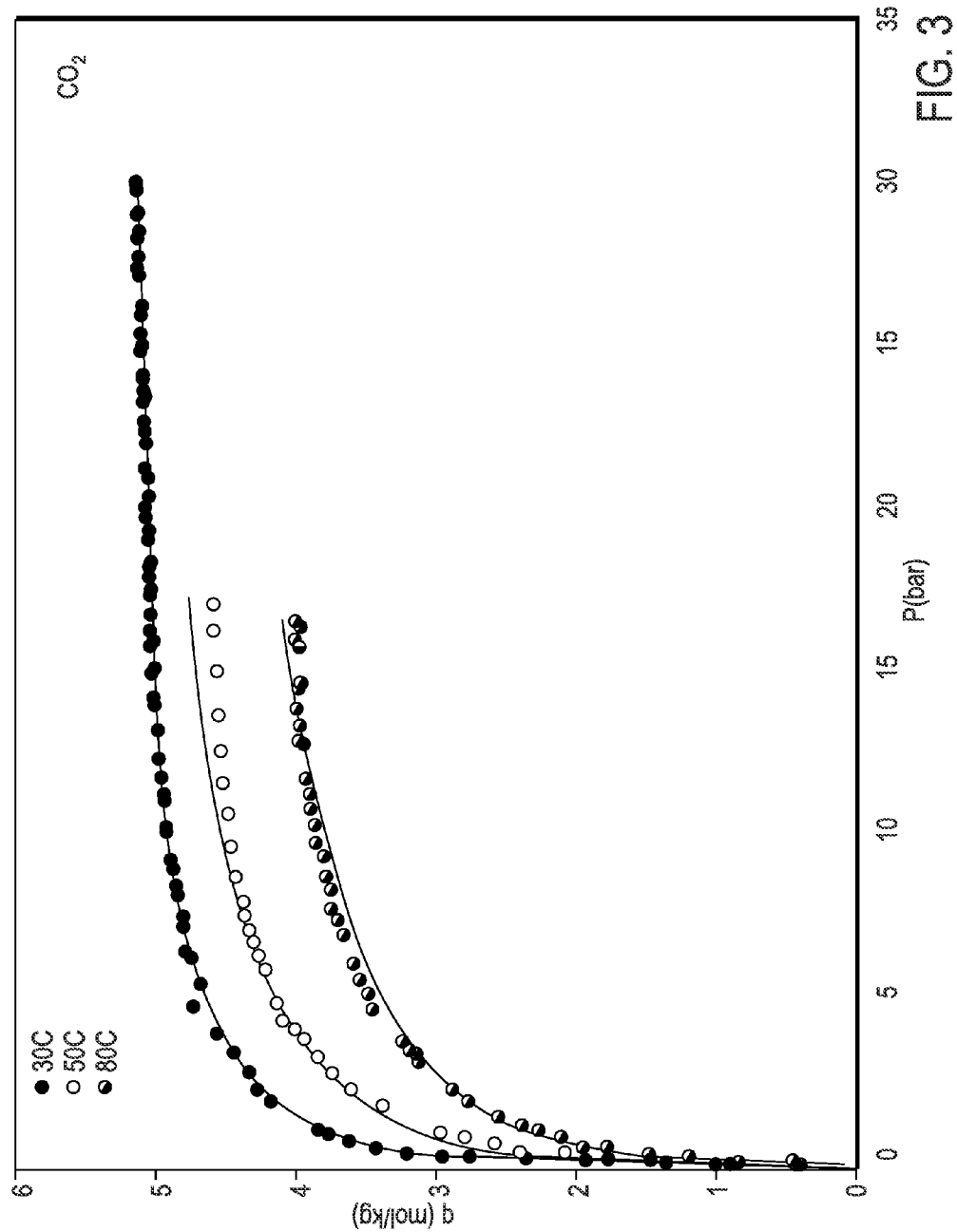
FIGS. 3-7 show the equilibrium adsorption results for $CO_2$, $CH_4$, $C_2H_6$, $H_2O$ and $H_2S$, respectively, according to exemplary embodiments.
Figure 4:
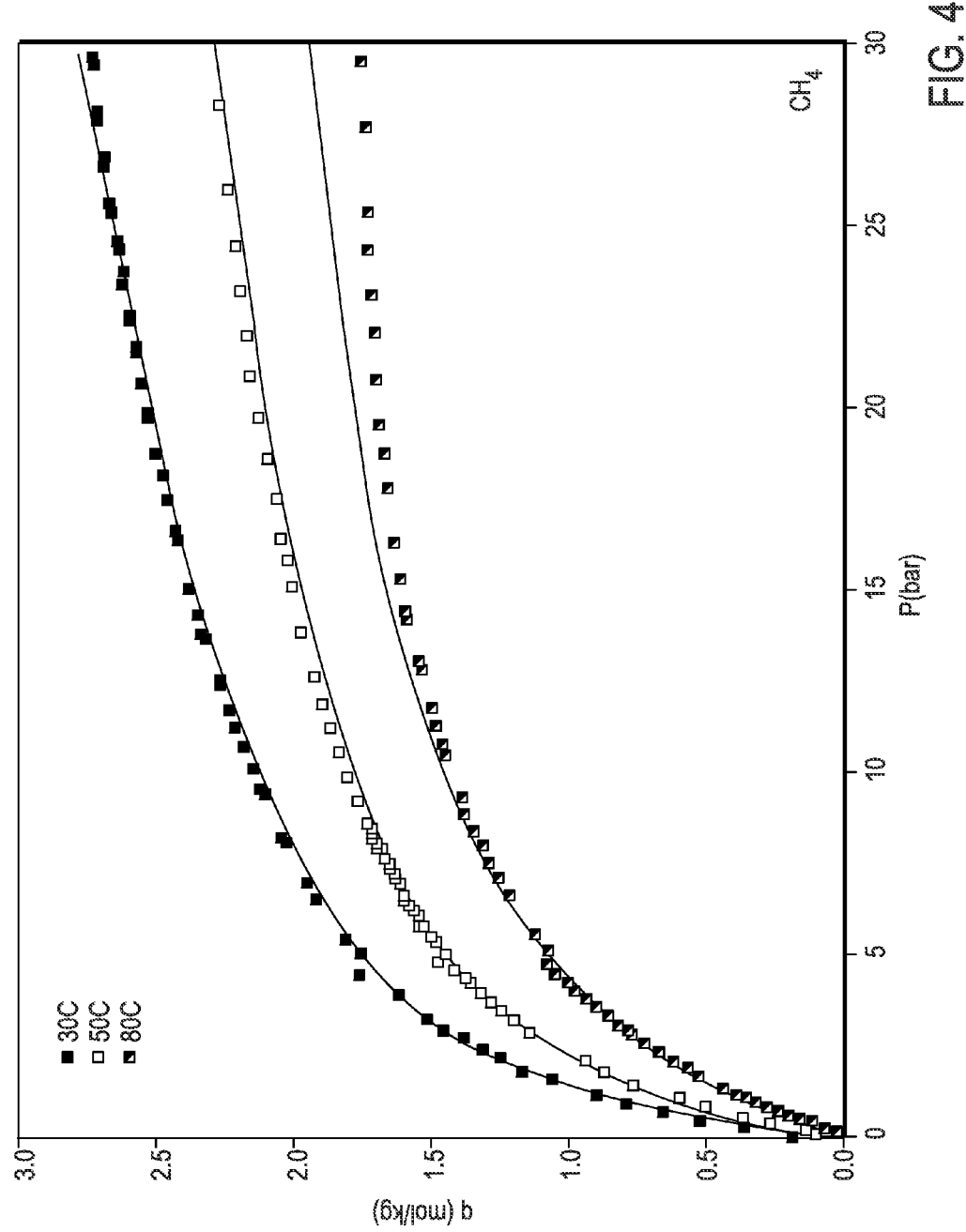
Figure 5:
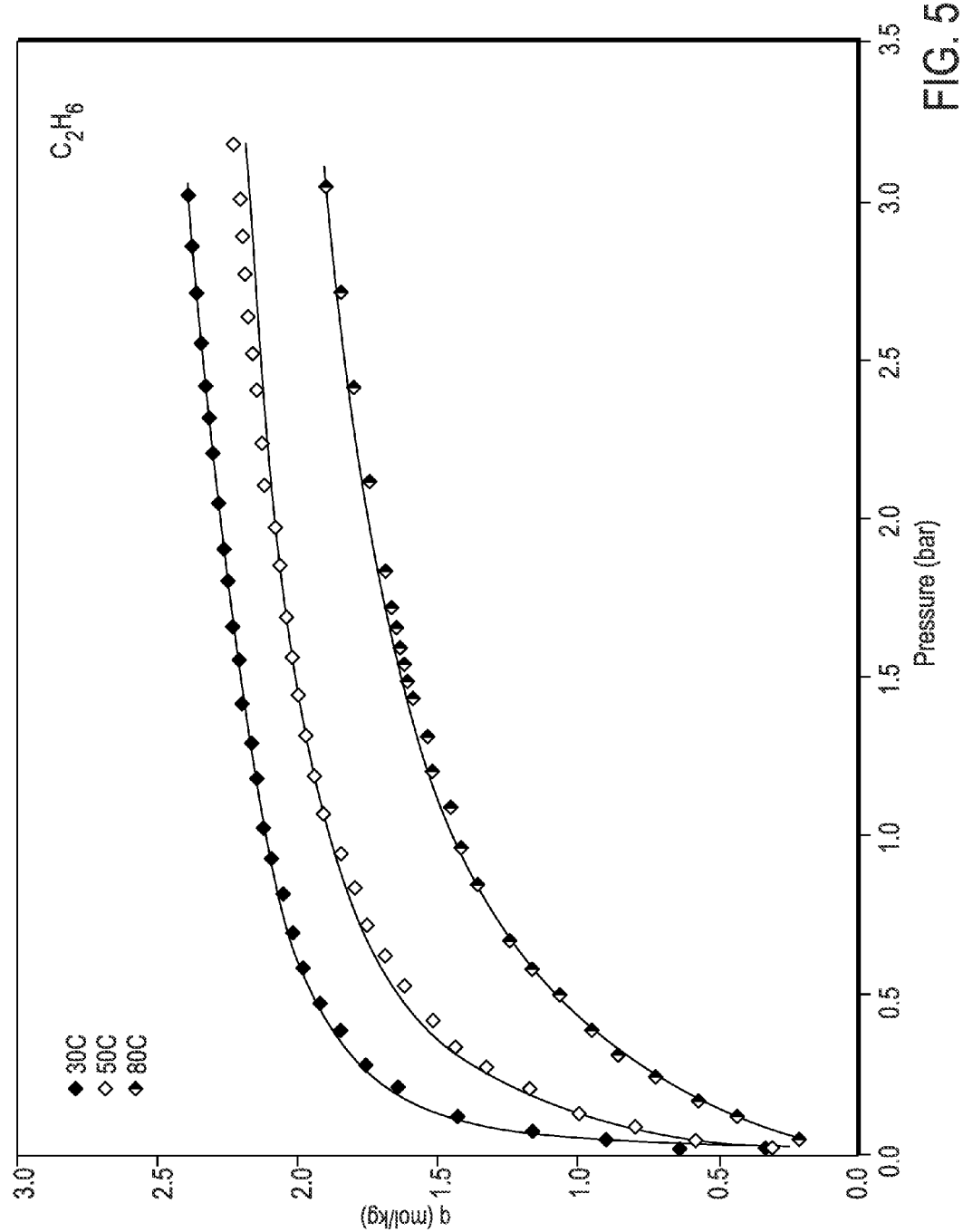
Figure 6:
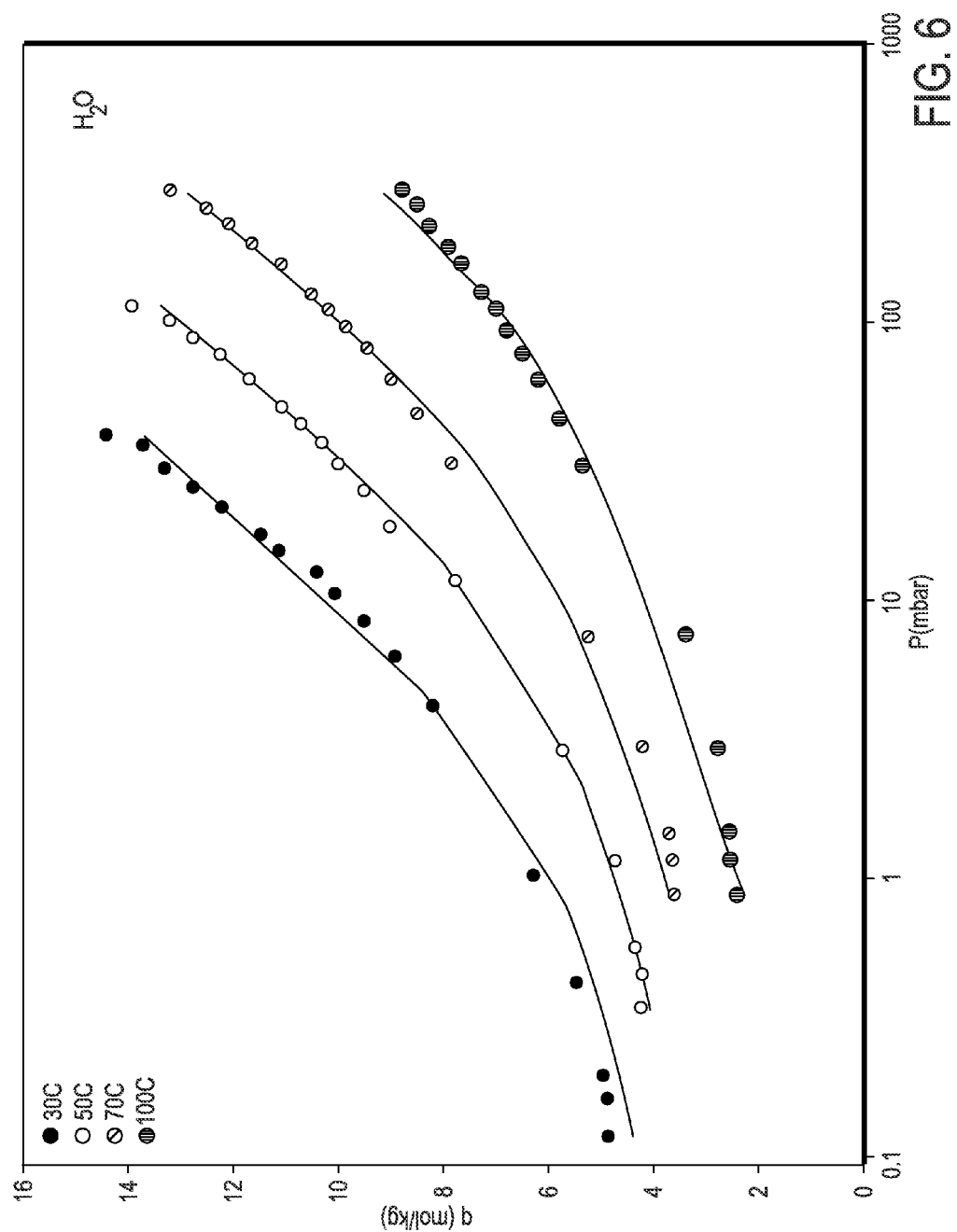
Figure 7:
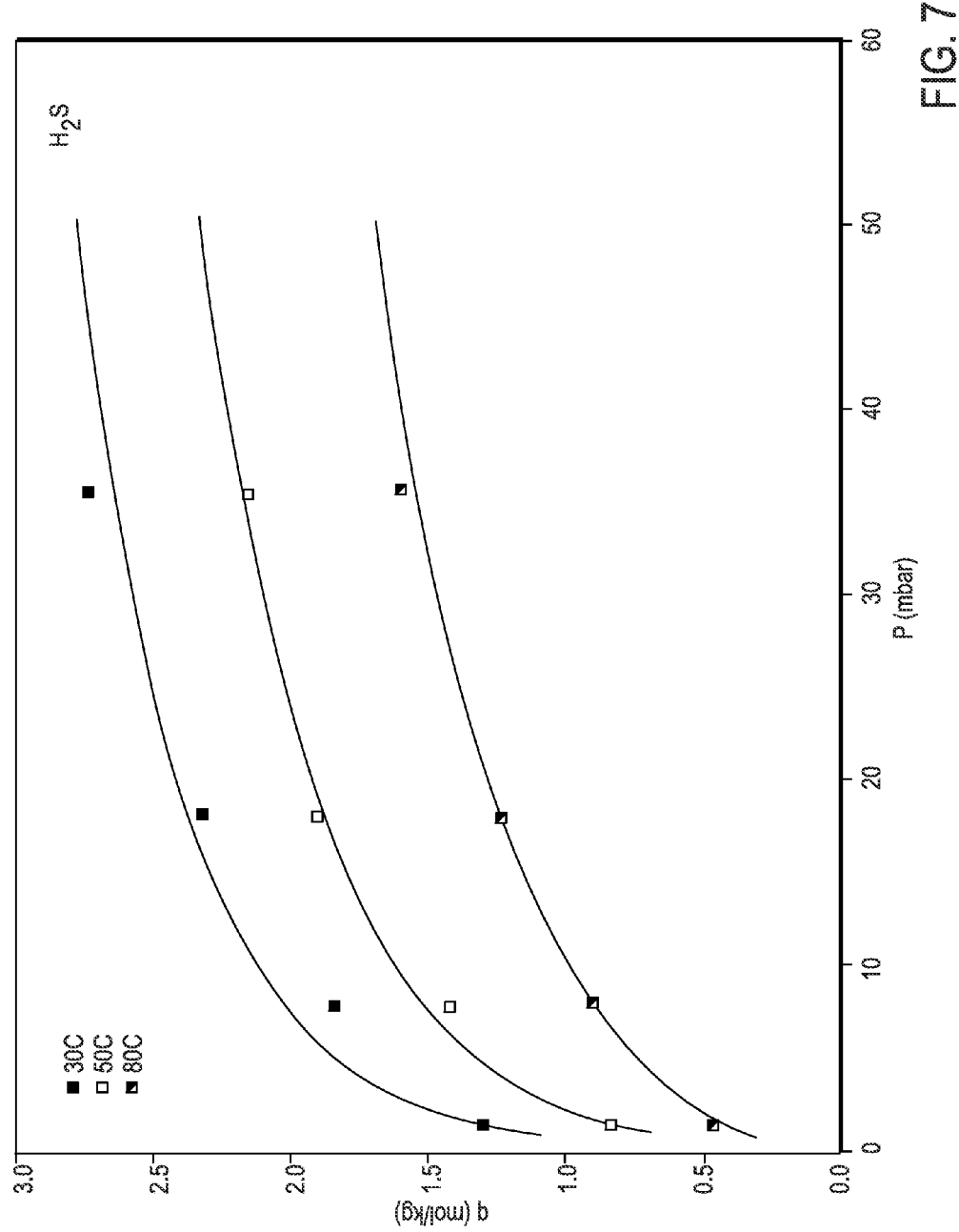
Figure 8:
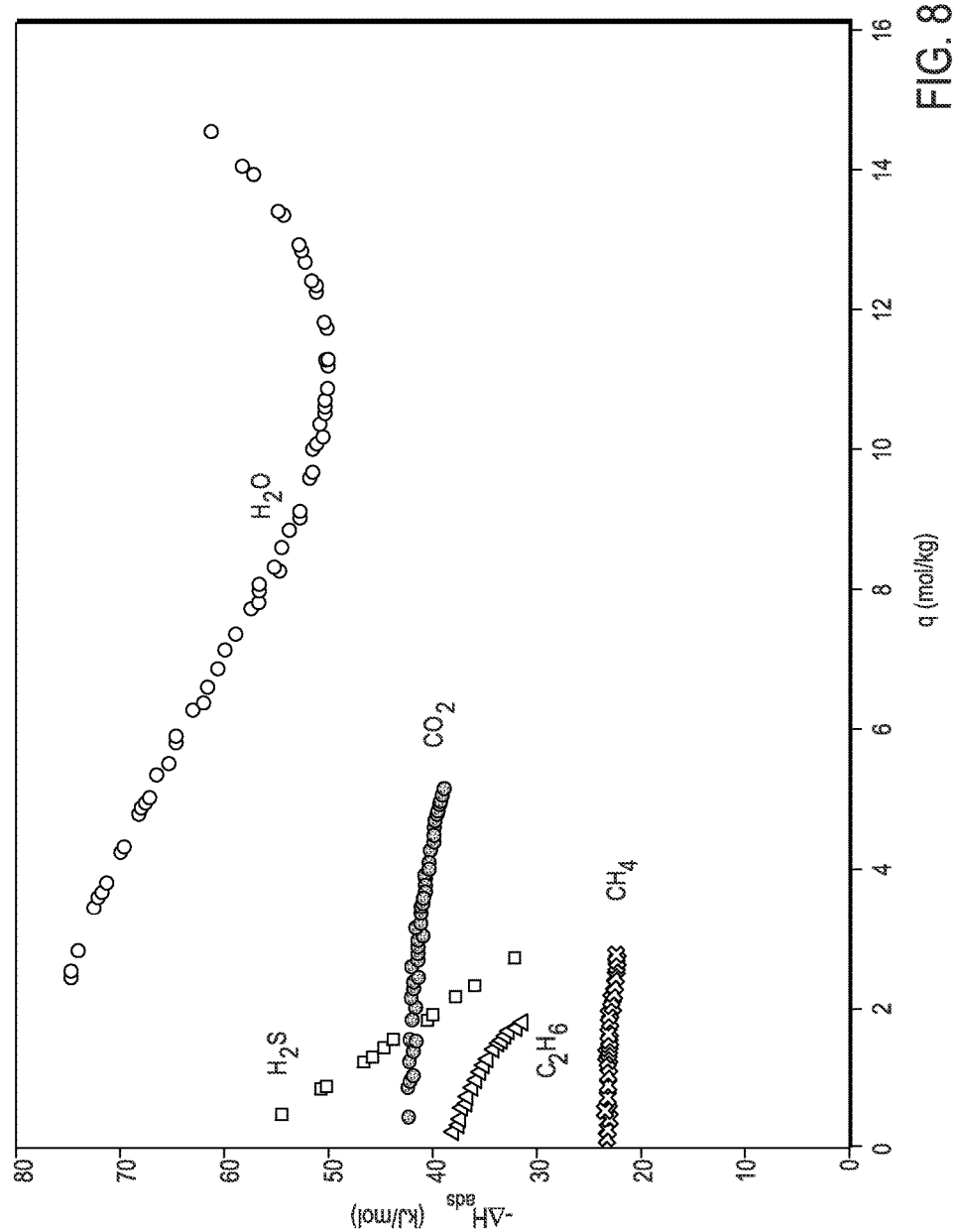
FIG. 8 is a plot of enthalpy of adsorption for each natural gas component on Na-SSZ-13 according to exemplary embodiments.
Figure 9:
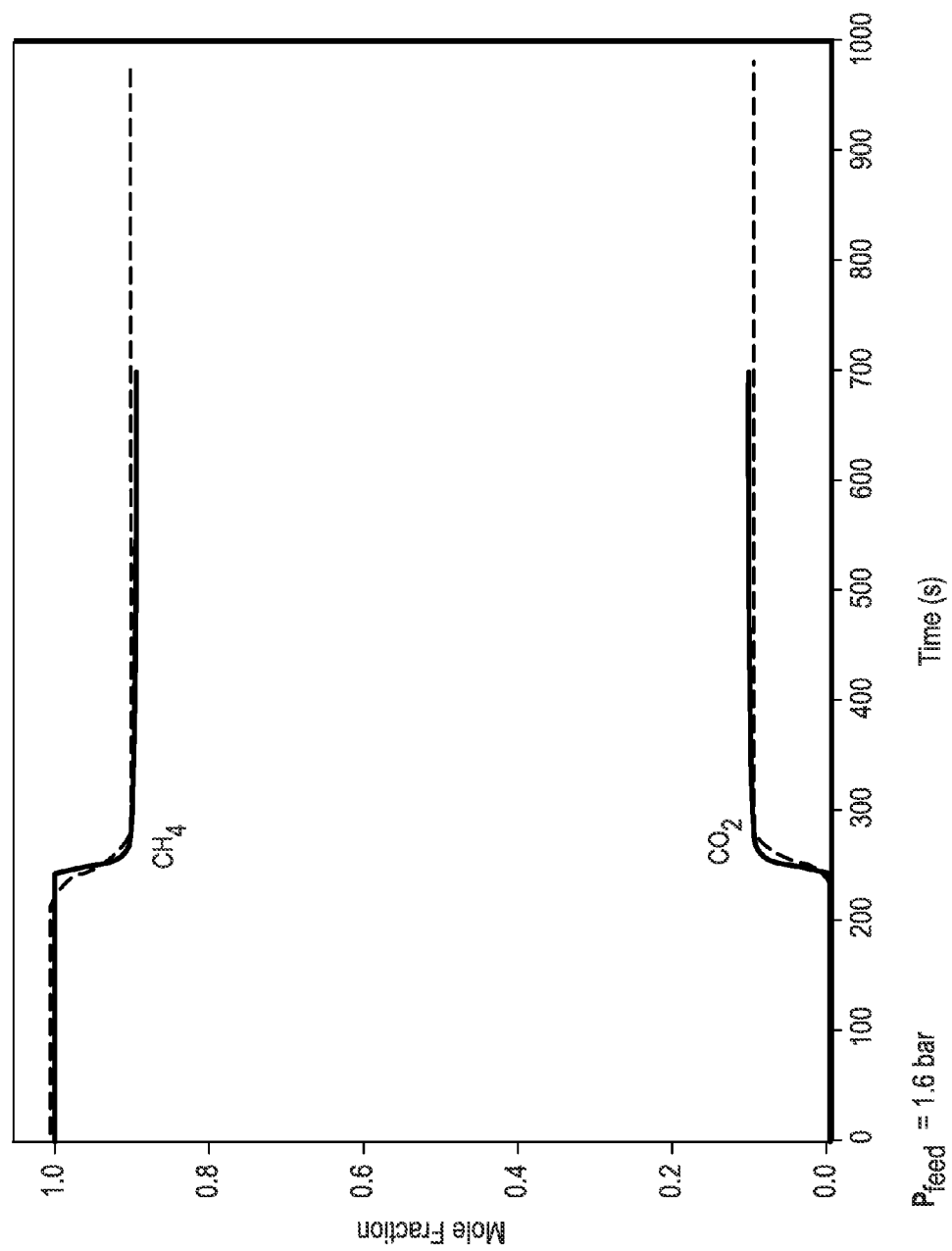
FIGS. 9-16 are representative breakthrough curves comparing experimental and simulation breakthrough behavior for Na-SSZ-13 according to exemplary embodiments.
Figure 10:
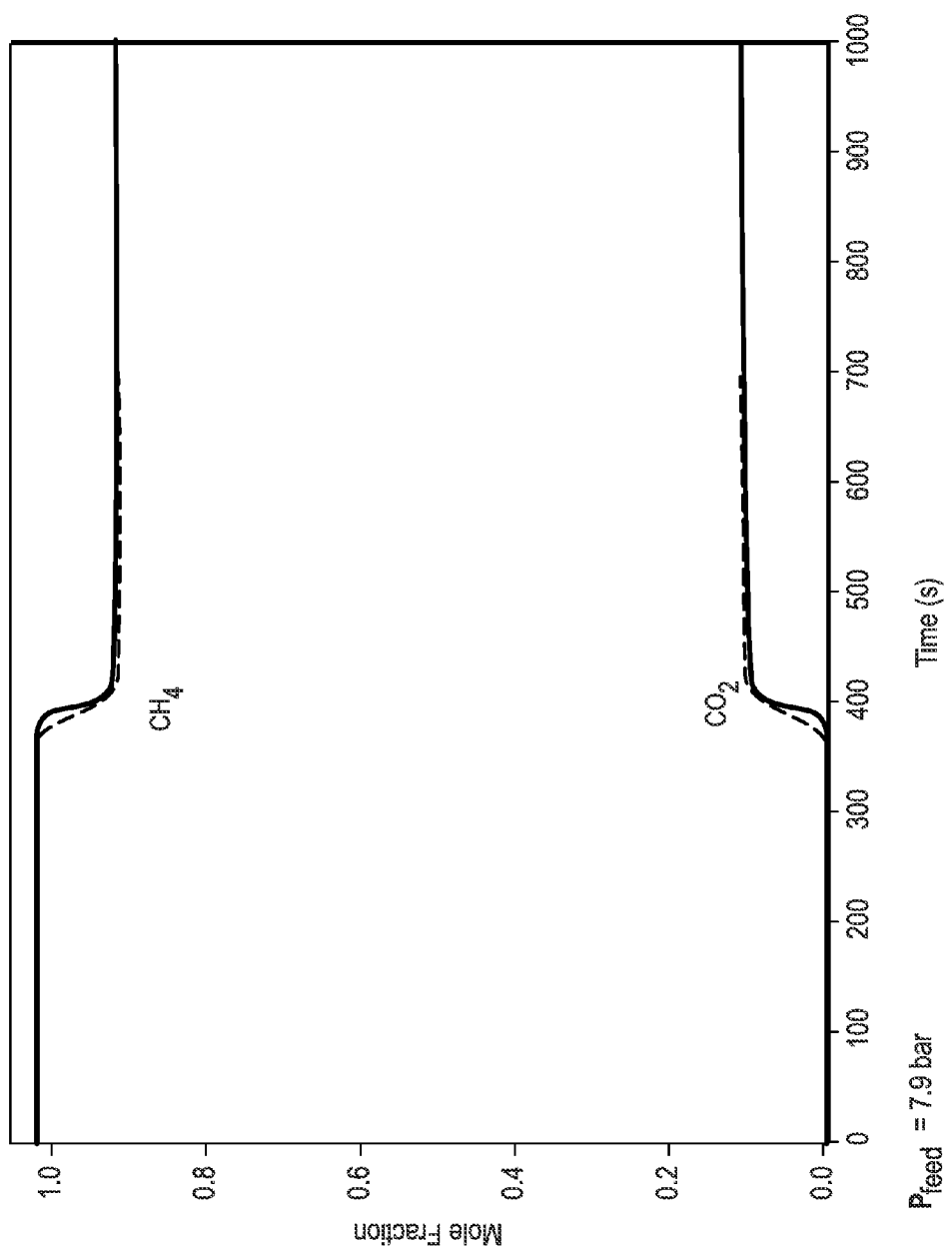
Figure 11:
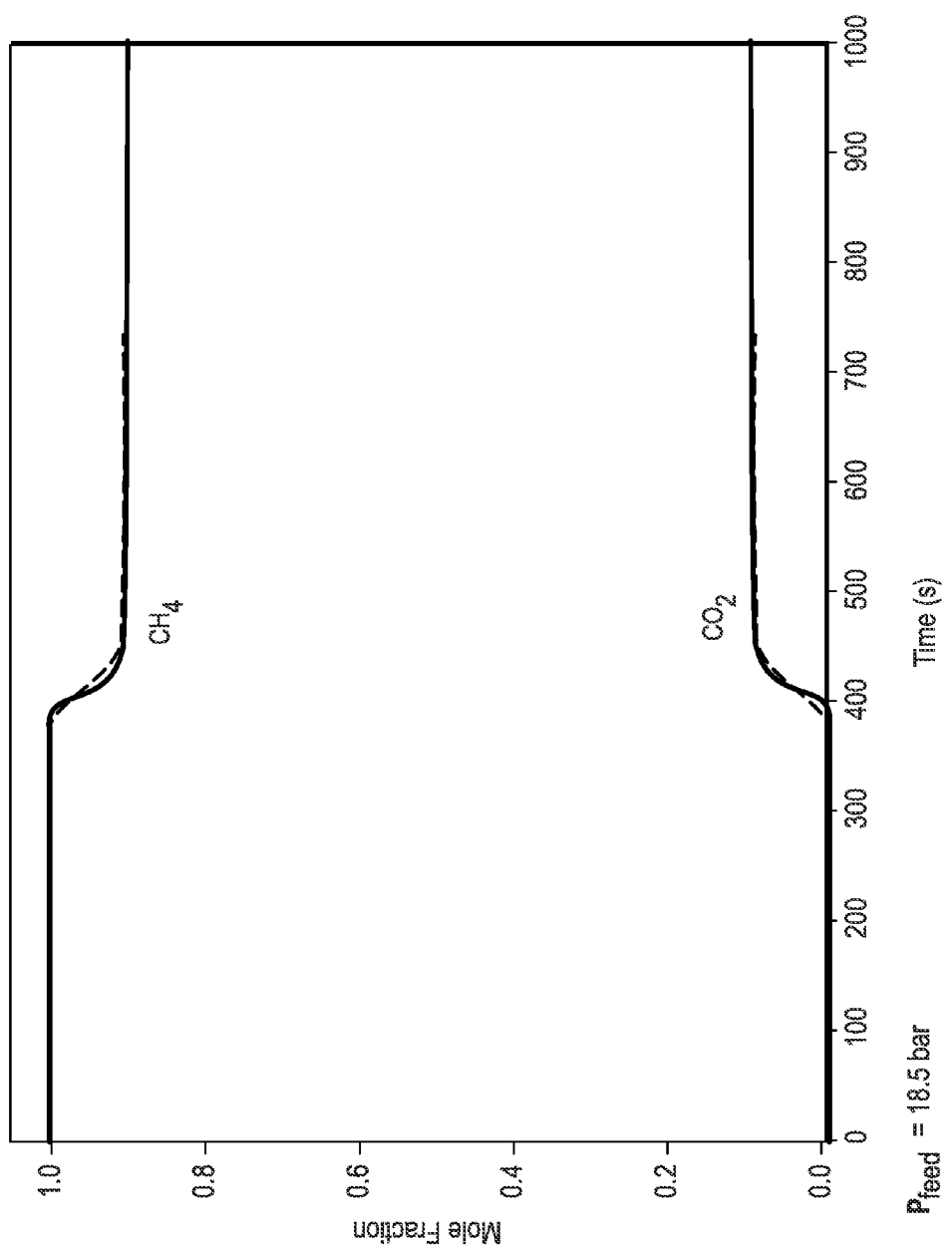
Figure 12:
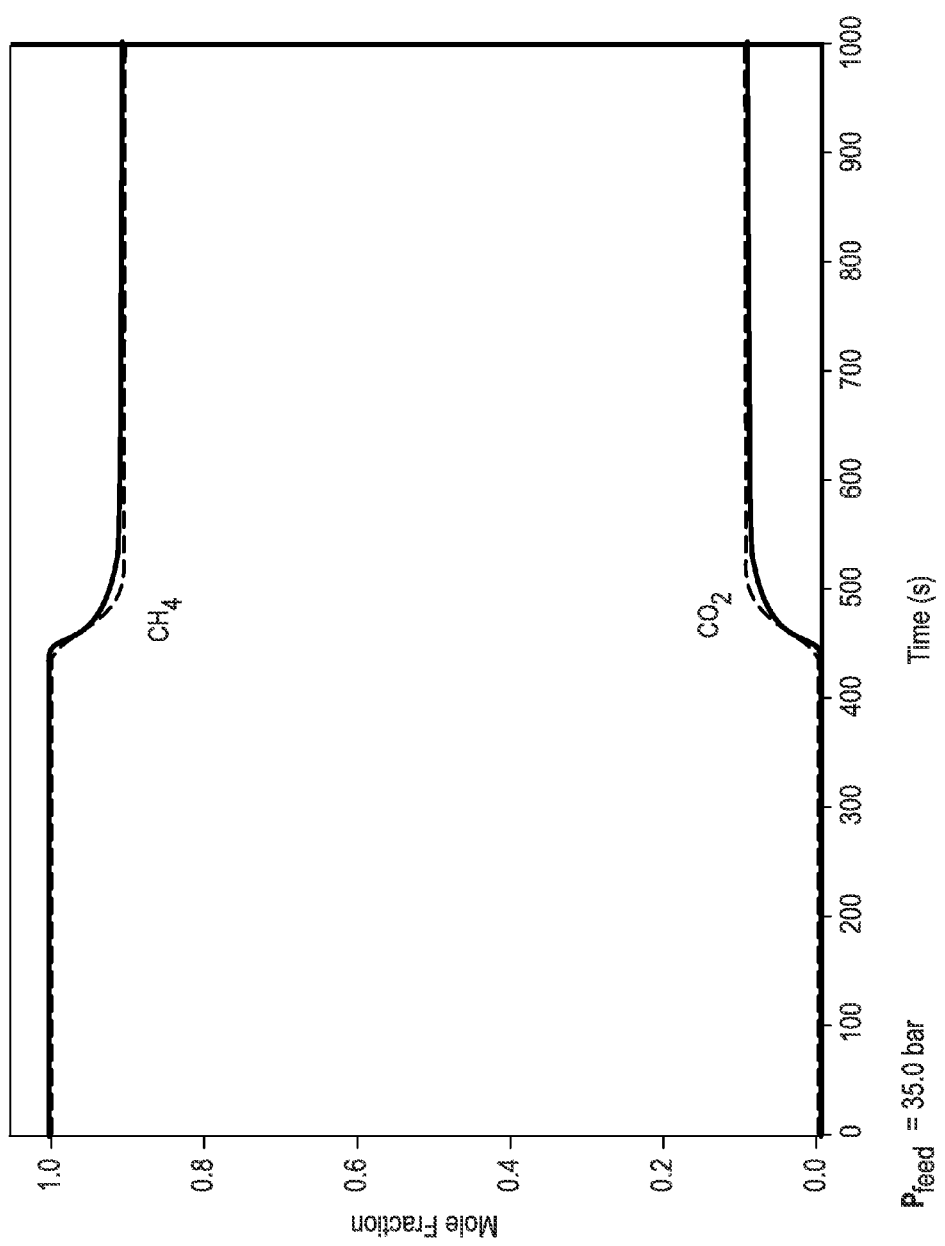
Figure 13:
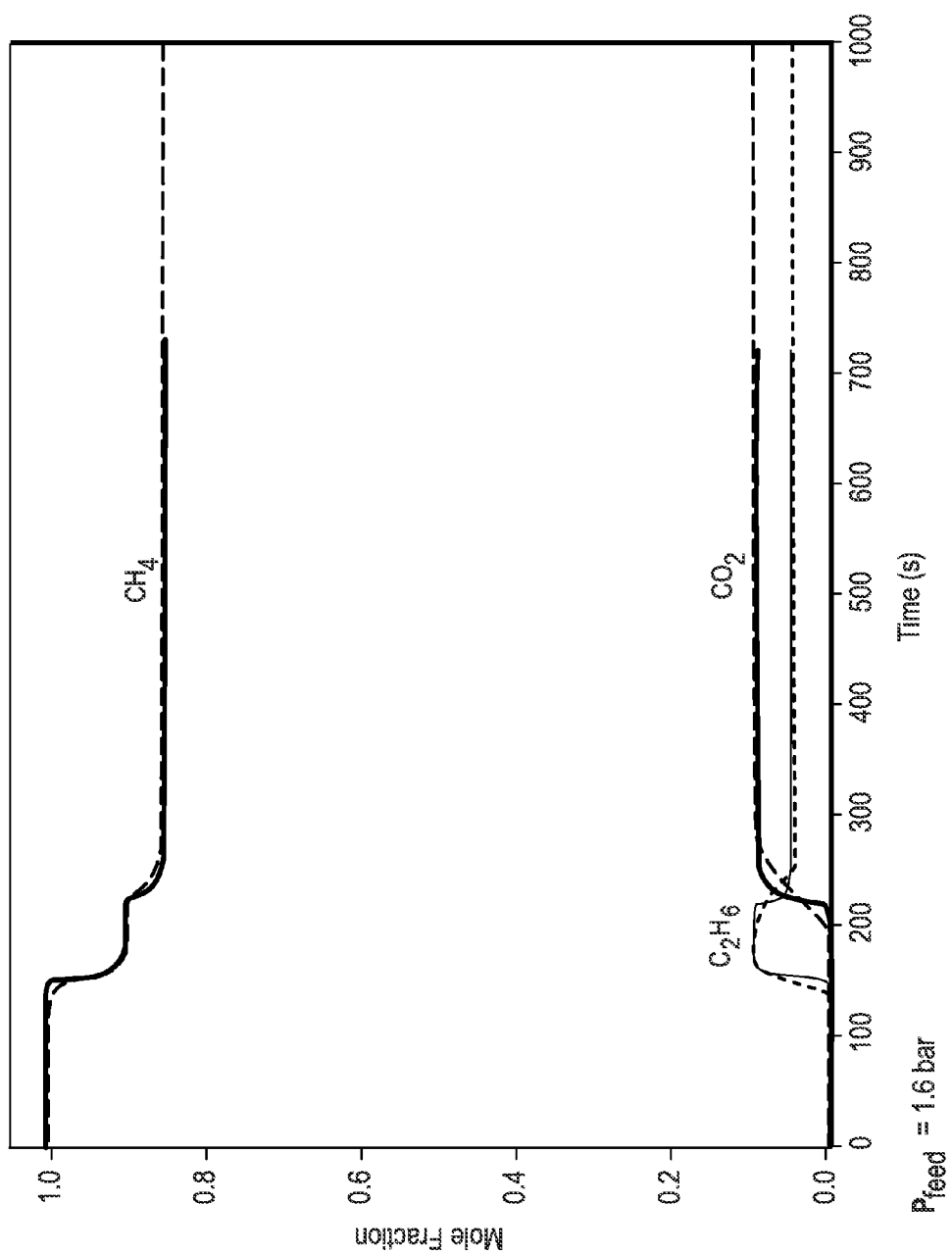
Figure 14:
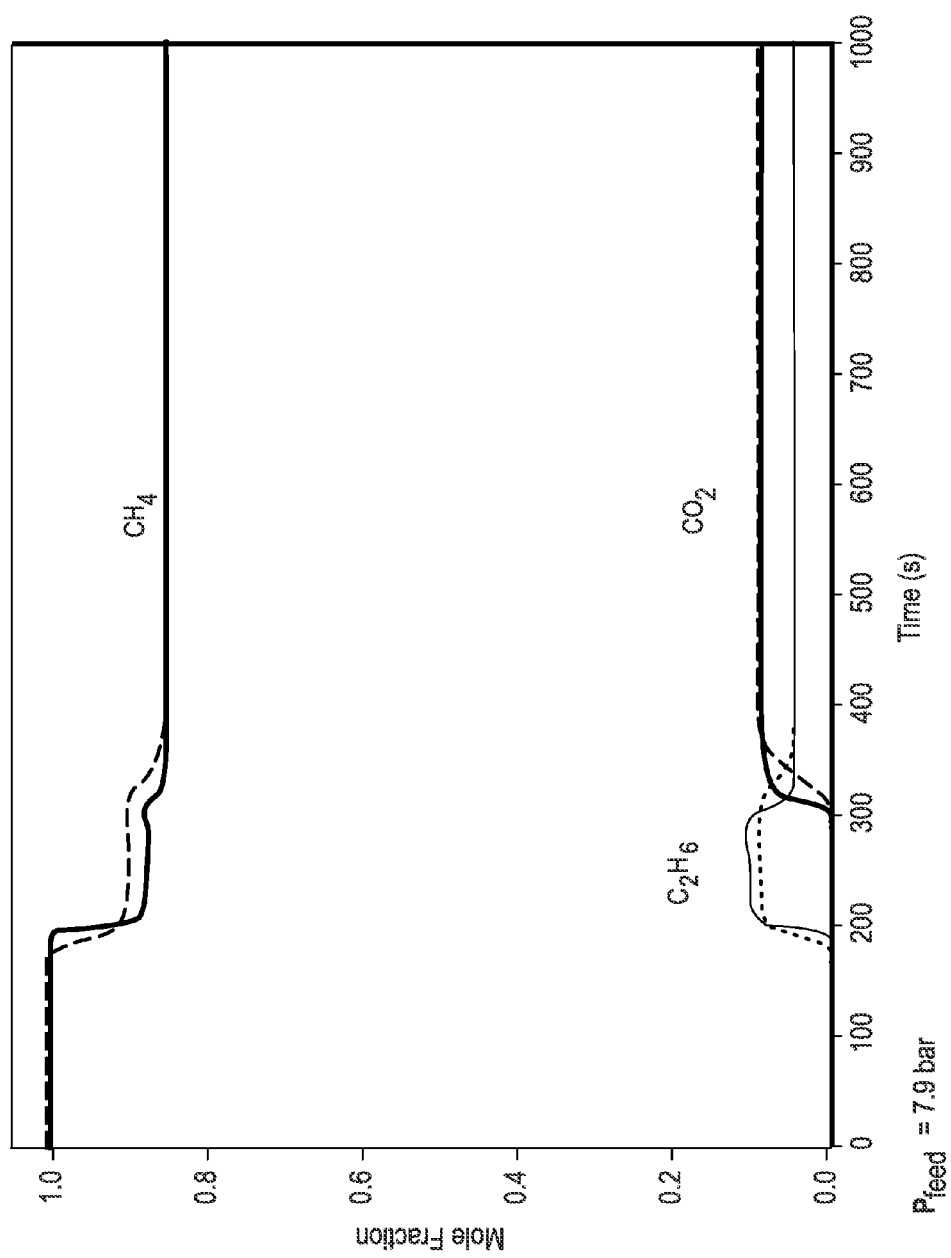
Figure 15:
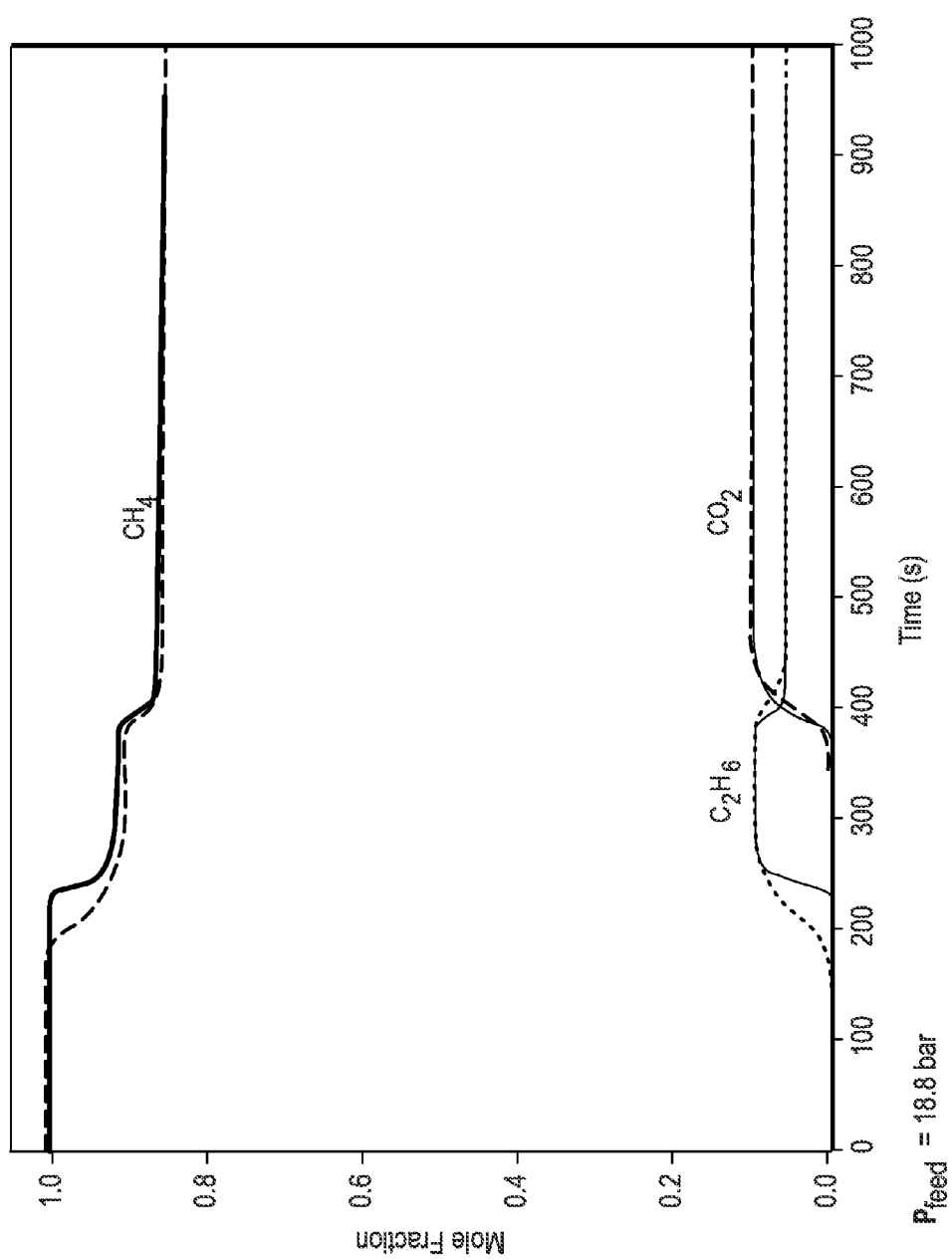
Figure 16:
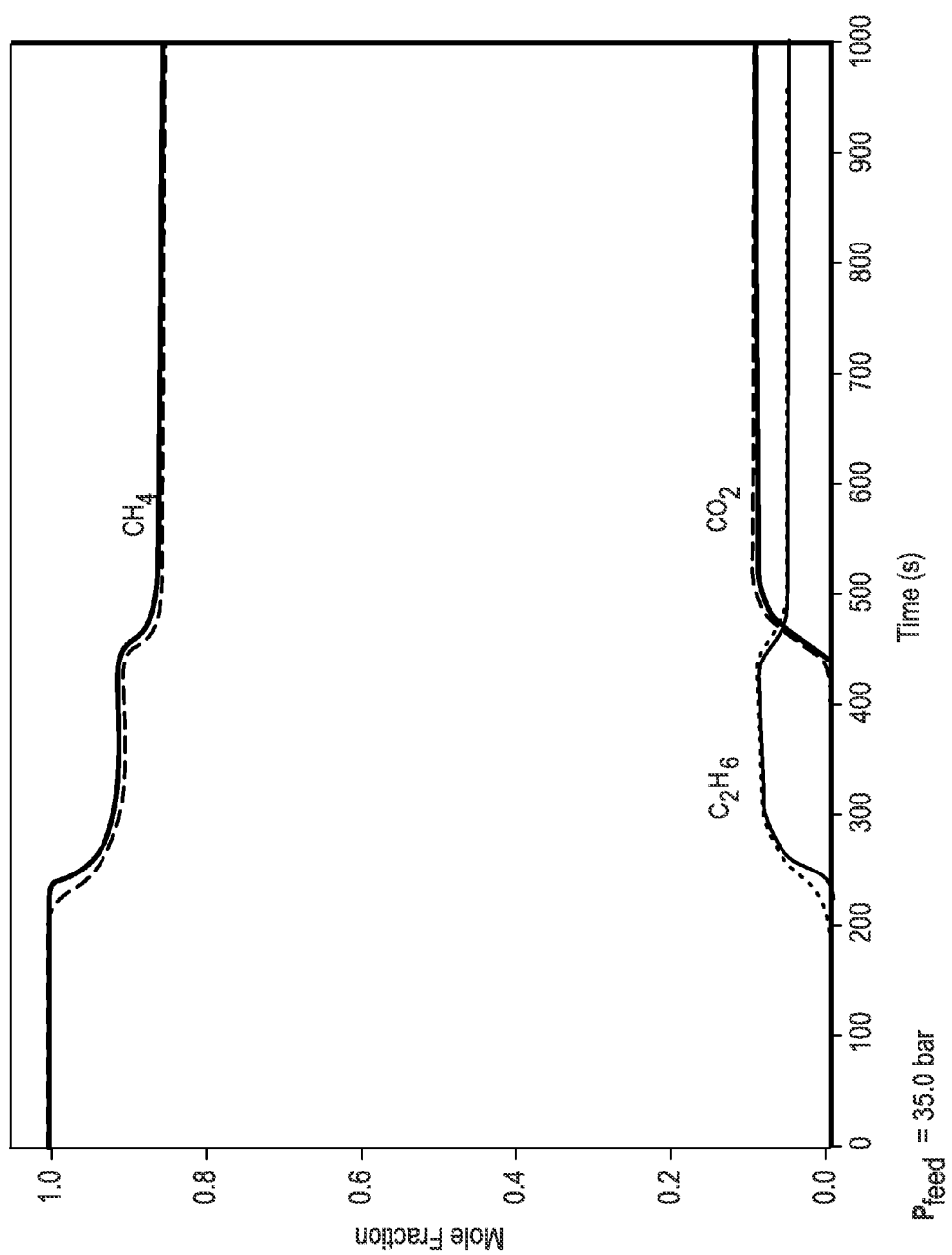

FIGS. 3-7 show the equilibrium adsorption results for $CO_2$, $CH_4$, $C_2H_6$, $H_2O$ and $H_2S$, respectively. Lines represent the fit of the dual-site Langmuir isotherm equation. FIG. 3 plots $CO_2$ equilibrium adsorption isotherms at 30-80° C. FIG. 4 plots $CH_4$ equilibrium adsorption isotherms at 30-80° C. FIG. 5 plots $C_2H_6$ equilibrium adsorption isotherms at 30-89° C. FIG. 6 plots $H_2O$ equilibrium adsorption isotherms at 30-100° C. FIG. 7 plots $H_2S$ equilibrium adsorption isotherms at 30-80° C. FIGS. 3-7 represent either major hydrocarbon components or major impurities found in natural gas wells with $CO_2$, $CH_4$ and $C_2H_6$ making up 60-90 vol % of most natural gas wells. If an adsorbent is capable of separating $CH_4$ and $C_2H_6$ from $CO_2$, most hydrocarbons may be recovered, especially in application of lean gas mixtures, where very little heavier hydrocarbon components are found. Because the Na-SSZ-13 has a lower amount of aluminum in the zeolite framework, the $CO_2$ adsorption isotherms do not show saturation at moderate temperatures until the $CO_2$ pressure reaches above 10 bar. The $C_2H_6$ adsorption isotherms show much lower saturation pressures with very little increase in adsorbed capacity above 1 bar of pressure. Although the SSZ-13 sample used in this Example has a higher SAR than typical adsorbents, such as zeolites 5A, Na—X or Na—Y, the $H_2O$ adsorption affinity was found to be quite high. Further increasing the SAR may lower the overall affinity for water. The $H_2S$ adsorption isotherms determined from breakthrough experiments showed very high adsorption affinity. The adsorption affinity for Na-SSZ-13 is of the order: $H_2O > H_2S > CO_2 > C_2H_6 > CH_4$. The ideal selectivity of both gas pairs, $CO_2/C_2H_6$ and $CO_2/CH_4$, is 1.7 and 44 at 30° C. The enthalpy of adsorption for each natural gas component on Na-SSZ-13 is shown in FIG. 8.

Gases with lower molecular weight or lower polarity show significantly lower enthalpies of adsorption compared to components like $H_2S$ and $H_2O$ that have extremely high polarity, and the heat of adsorption correlates with adsorption affinity. For processing natural gas containing these components, it is expected that gas streams containing significant amounts of $CO_2$, $H_2S$ or $H_2O$ will generate rises in temperature inside the adsorption bed when removing these components during an adsorption cycle.

Example 3

Dynamic Column Breakthrough (DCB) Adsorption Performance

Dynamic adsorption experiments were carried out on a custom-built DCB apparatus, as shown in FIG. 2. Three lines 1, 2 and 3 were provided for test gases to be fed to the apparatus and metered using mass flow controllers 4. Block valves 5 and switching valves 7 were provided for controlling flow in each line. A line 9 having heat tracing for controlling the temperature within the line delivered the test gases to an adsorption column 8 containing the adsorbent pellets therein. The adsorption column 8 was outfitted with a heater 12, specifically an electrically heated ceramic clamshell heater, and a number of thermocouples 6. Line 13 removed treated gas from the column 8 Line 21 sent the treated gas to a back-pressure regulator 16. Lines 13 and 21 had heat tracing. Pressure transducer 14 monitored the pressure in line 21. Mass flow meter 18 monitored the mass flow in line 21. Relief valves 11 were provided. Line 15 connected the relief valve 11*a* to a $H_2S$ scrubber 22. Switching valve 17 was provided. Line 19 connected switching valve 17 to the $H_2S$ scrubber 22. The $H_2S$ scrubber 22 separated dilute sulfuric acid 24 from water 23. The mass spectrometer 20 monitored the signal of gases at the following masses: 16 m/z, 18 m/z, 30 m/z, 34 m/z, 44 m/z and 60 m/z for $CH_4$, $H_2O$, $C_2H_6$, $H_2S$, $CO_2$ and COS, respectively. For $C_2H_6$, a mass of 30 m/z was used to avoid interference of $CO_2$ at 28 m/z and corrected based on the relative signal expected in a $C_2H_6$ mass spectrum, using a ratio of 26.2% of total $C_2H_6$. The bulk bed temperature was monitored using two thermocouples 6 at approximately ¼th and ¾th the length of the bed during experiments, and the bed temperature was controlled by an external furnace 12 with three heating zones. The bed temperatures were recorded every 30 s, and maximum temperature at the experimental time for each thermocouple 6 was also recorded. Flow rates were recorded from the mass flow meter (MFM) 18 immediately after the back-pressure regulator 16 and immediately before the mass spectrometer 20. The breakthrough capacity was determined using the methodology described for the $H_2S$ breakthrough capacity experiments.

The dynamic adsorption experiments may be predicted by simulations coupling together momentum, mass and energy balances of a packed bed adsorption column. All simulations were performed using the Aspen Adsorption simulation package from AspenTech (commercially available from Aspen Technology, Inc., Bedford, Mass.). The adsorption kinetics were assumed to occur by the Linear Driving Force (LDF) mechanism as described in D. M. Ruthven, *Principles of Adsorption and Adsorption Processes*, John Wiley & Sons, Inc.: New York, 1984, according to equation (3).

$$\frac{\partial \overline{q}_i}{\partial t} = k_i(q_i - \overline{q}_i) \tag{3}$$

where $q_i$ is the adsorbed-phase concentration and $k_i$ is the lumped mass transfer coefficient for component i. Depending on the conditions of the adsorption and desorption processes, the micropores of the zeolites and the macropores of the pellets may influence the adsorption kinetics. In order to account for these possible adsorption kinetics and any film resistances that occur on the pellet surface, a lumped mass transfer coefficient was determined from the following correlation as described in D. M. Ruthven, S. Farooq, K. S. Knaebel, *Pressure Swing Adsorption*, John Wiley & Sons, Inc.: New York, 1994, according to equation (4).

$$\frac{1}{k_i} = \frac{r_p}{3k_{f,i}} \frac{q_{f,i}}{C_{f,i}} + \frac{r_p^2}{15\varepsilon_i D_{p,i}} \frac{q_{f,i}}{C_{f,i}} + \frac{r_c^2}{15 D_{c,i}} \tag{4}$$

where $k_f$ is the film mass transfer coefficient, $r_p$ is the pellet radius, $q_{f,i}$ and $C_{f,i}$ are the adsorbed- and gas-phase concentrations of component i at the feed conditions, $\varepsilon_i$ is the intraparticle void fraction, $D_{p,i}$, is the effective macropore diffusivity, $r_e$ is the crystal radius and D is the crystal diffusivity. Typically, the film resistance is negligible if the macropore and micropore resistances are much slower or higher flow rates of gas are used. The effective macropore diffusivity was determined by a combination of molecular diffusion and Knudsen diffusion as described in A. L. Hines, R. N. Maddox, *Mass Transfer: Fundamentals and Applications*, Prentice Hall, Inc.: Engelwood Cliffs, N J, 1985, according to equations (5) and (6).

$$D_{k,i} = 4500 d_{macro} \sqrt{\frac{T}{M_i}} \tag{5}$$

$$\frac{1}{D_{p,i}} = \tau \left( \frac{1}{D_{k,i}} + \frac{1}{D_{m,i}} \right) \tag{6}$$

where $D_{k,i}$ is the Knudsen diffusivity, $d_{macro}$ is i the pore diameter of the macropores, and $\tau$ is the tortuosity, often assumed to be between 2 and 3. Finally, because the Na-SSZ-13 crystals produced in Example 1 are relatively small, the crystal, or micropore, diffusivity was assumed to be negligible.

In order to predict the adsorption behavior in multicomponent feeds, Ideal Adsorbed Solution Theory (IAST) was used to predict the mixture adsorption properties by using models that accurately describe the pure component adsorption properties, as described in A. L. Myers, J. M. Prausnitz, "Thermodynamics of Mixed-Gas Adsorption", *AIChE J.*, 1965, 11, 121-127. IAST has been shown to be reasonably accurate for predicting gas mixture adsorption behavior in zeolite materials with $CO_2$ in the feed, as described in L. Ohlin, M. Grahn, "Detailed Investigation of the Binary Adsorption of Carbon Dioxide and Methane in Zeolite Na-ZSM-5 Studied using In-Situ ATR-FTIR Spectroscopy", *J. Phys. Chem. C*, 2014, 118, 6207-6213.

DCB Experimental and Simulation Results

In order to understand the adsorption mechanism and behavior of gas mixtures in a packed bed adsorption column, dynamic adsorption studies studying breakthrough curves are commonly used to assess the performance of different adsorbent materials. Although most studies examine the system response of the adsorbent when gas is introduced to a clean bed (pre-loaded with He, for instance), the experiments disclosed herein have examined the system response to introducing $CO_2$ and $C_2H_6$ to a packed bed already containing $CH_4$. To simulate the breakthrough curves, the adsorbent equilibrium, kinetic and physical properties have been determined by data from Example 2 and correlations and equations known in the prior art.

Representative breakthrough curves comparing experimental and simulation breakthrough behavior for Na-SSZ-13 are shown in FIGS. 9-16. For binary feeds of $CO_2$ and $CH_4$ (FIGS. 9-12), breakthrough curves match well with the simulated breakthrough using the assumptions described in this Example and known in prior art. It was found that with IAST gas adsorption models the breakthrough profile could be simulated well. Using other known gas adsorption mixture models resulted in poor agreement with the experimental data. For ternary feeds of $CO_2$, $C_2H_6$ and $CH_4$ (FIGS. 13-16), the breakthrough profile for $C_2H_6$ shows what is known in prior art as "roll-up" effect, where there is temporary enrichment of $C_2H_6$ compared to the feed composition. The roll-up shown in these data indicate the enrichment is caused by favorable adsorption of $CO_2$ over $C_2H_6$, a desirable adsorption property for a natural gas adsorbent. Again, the IAST adsorption model reasonably predicts the roll-up effect observed for $C_2H_6$ and the breakthrough profile for $CO_2$ using the assumptions in this Example.

Figure 17:
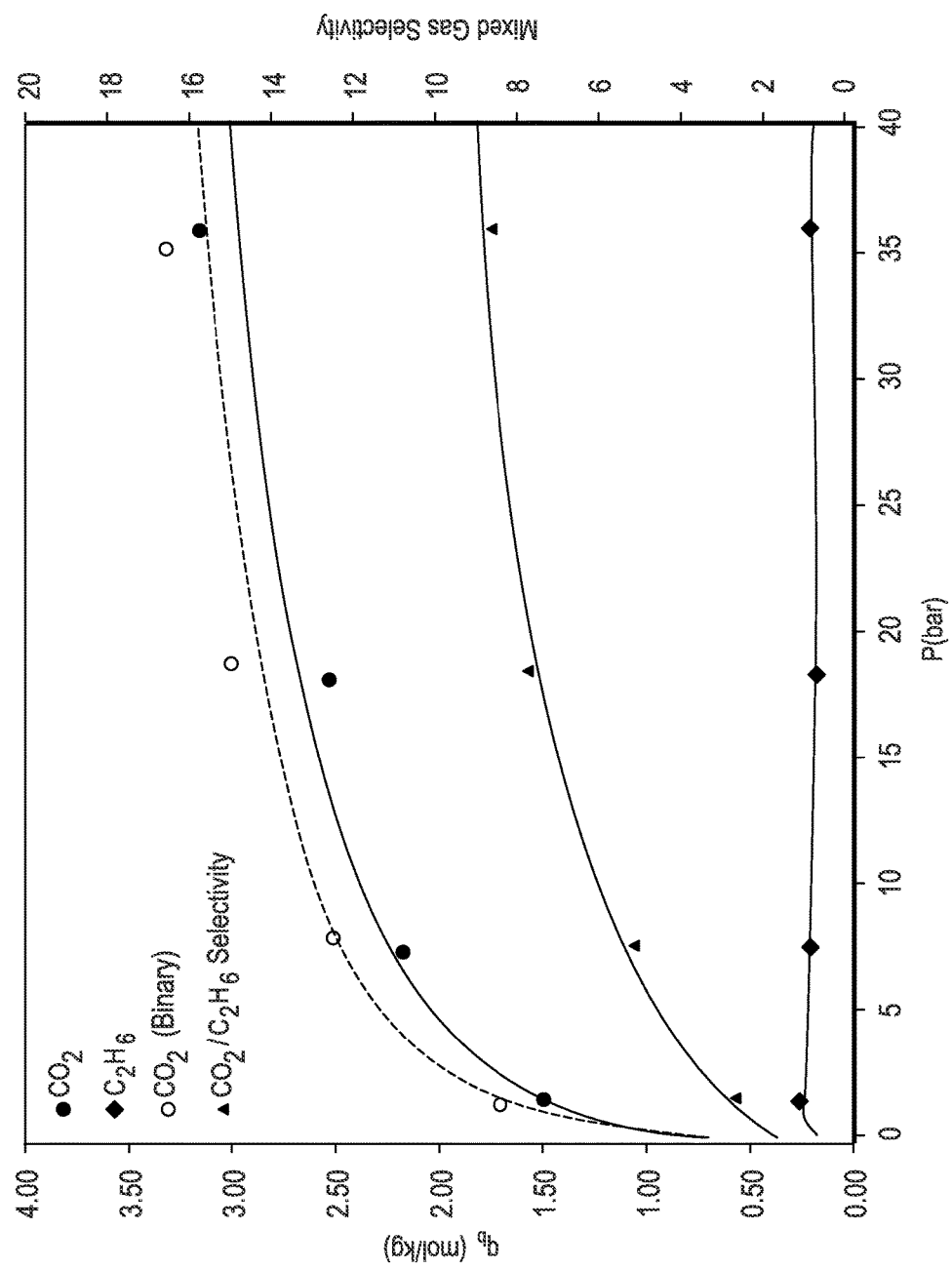
FIG. 17 is a plot of calculated breakthrough capacities for $CO_2$ and $C_2H_6$ according to exemplary embodiments.

FIG. 17 is a plot illustrating the amounts of $C_2H_6$ and $CO_2$ adsorbed on zeolite SSZ-13 with increasing feed pressure. These are results from an experimental study of feeding gas containing 10 mol % $CO_2$, 85 mol % $CH_4$, and 5 mol % $C_2H_6$ to an adsorption bed of Na-SSZ-13 pellets. The capacity is a term used to describe the amount of gas adsorbed onto the solid normalized by the amount of adsorbent used in the experiment. As shown, with increasing feed pressure, the amount of $CO_2$ adsorbed increases while the amount of $C_2H_6$ adsorbed decreases. This results in a monotonic increase in adsorption selectivity for $CO_2/C_2H_6$ with increasing feed pressure. The lines in FIG. 17 represent IAST modeling results using the pure gas data. These models are then used to predict the process parameters for Na-SSZ-13 in a PSA process as discussed in Example 4. Comparison of the $CO_2$ breakthrough capacity from the binary and ternary breakthrough experiments shows only 10% or less decrease in capacity with the introduction of $C_2H_6$ to the feed mixture. The mixed gas $CO_2/C_2H_6$ selectivity for Na-SSZ-13 shows an increase with feed pressure and reaches an adsorption selectivity of 9 at 35 bar of feed pressure. The unique behavior observed in this Example is that the adsorption selectivity is shown to increase with feed pressure, which is also predicted with the IAST gas adsorption model. This phenomenon results in a negative working capacity for $C_2H_6$ adsorbing onto Na-SSZ-13. This is unlike most adsorbent materials shown in prior art, including zeolite Na-13X, which have a typical adsorption selectivity in the same range (2-10), but decreases with feed pressure.

Figure 18:
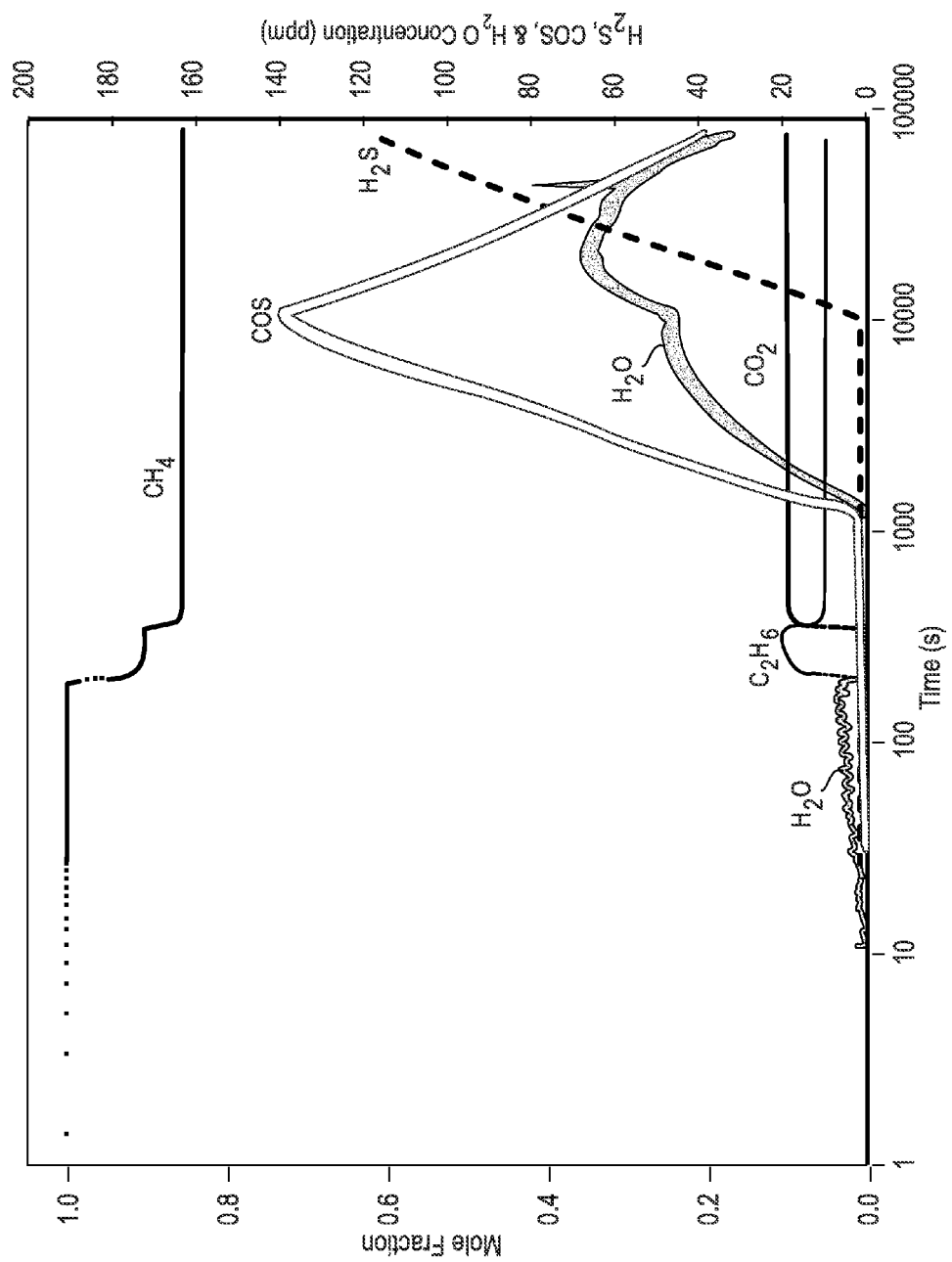
FIG. 18 is a representative breakthrough curve for a quaternary feed mixture containing $CO_2$, $C_2H_6$, $H_2S$ and $CH_4$.

A representative breakthrough curve for a quaternary feed mixture containing $CO_2$, $C_2H_6$, $H_2S$ and $CH_4$ is shown in FIG. 18. Feed conditions are: $P_{feed}$=7.9 bar; 10 mol % $CO_2$, 5 mol % $C_2H_6$, 190 ppm H2S, balance $CH_4$. The appearance of COS and $H_2O$ is due to formation of impurities driven by equilibrium reaction. Because other adsorbent materials have demonstrated the ability to drive the equilibrium of $H_2S$ and $CO_2$ towards COS and $H_2O$ the concentration breakthrough profiles of these impurities are also shown. It is well known in prior art that under equilibrium conditions of:

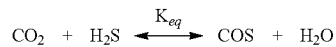

$$CO_2 + H_2S \xrightleftharpoons{K_{eq}} COS + H_2O$$

COS and $H_2O$ will exist in very small concentrations relative to $H_2S$ and $CO_2$. In FIG. 18, both COS and $H_2O$ are found in concentrations above the expected equilibrium value of 5 ppm, given the feed concentration of $CO_2$ and $H_2S$. A significant advantage of Na-SSZ-13 over other adsorbents in the prior art is the sharp separation between COS and $CO_2$ in the product end of the bed. Because enriched natural gas has strict requirements on $H_2S$ and COS in the pipeline specifications, the ability to separate $CO_2$ and COS poses an advantage over traditional zeolite adsorbent materials, such as zeolites 5A, Na—X and Na—Y that have lower silica-to-alumina ratios (SAR) and typically high affinity for $H_2O$ and/or COS. Owing to the higher SAR in Na-SSZ-13, the formation of COS and $H_2O$ is less than expected for an aluminosilicate zeolite, and purification of hydrocarbons from these impurities, which include $CO_2$, $H_2S$, $H_2O$ and COS, can be achieved by a pressure-swing or temperature-swing adsorption process or a combination of these processes. More favorable conditions for mitigating the formation of COS and $H_2O$ may be achieved by changing the cation in the Na-SSZ-13 to Ca, K, Ba, etc., or further increasing the SAR. These changes to mitigate unwanted impurities in adsorbent would be balanced with hydrocarbon selectivity to maintain a desirable adsorbent material.

Example 4

Pressure- and Vacuum-Swing Adsorption Process Performance

Pressure-swing and vacuum-swing adsorption modeling provides a target for actual process performance by predicting the expected hydrocarbon recovery and $CO_2$ removal for natural gas separations. The process parameters used for the PSA modeling/simulations are shown in Table 2. Because PSA/VSA performance and economics roughly increase linearly with throughput or gas flow rate, a base case of 1.0 MM SCFD of feed gas is used to evaluate Na-SSZ-13. In addition, this scale of flow rate is also the usual operation for small scale natural gas production, providing a more reasonable comparison with existing commercial technology when determining the recovery of $CH_4$ and $C_2H_6$ and removal of $CO_2$ from the product gas. The PSA simulation is set up with the bed initially saturated with the feed gas at the feed pressure. Once the cyclic steady-state has been determined by monitoring both the mass and thermal balance between cycles, the simulation is stopped, and all necessary parameters are recorded. The simulation takes between 100-400 cycles to reach cyclic steady-state, depending on the process parameters being examined. The simulation approach uses a data buffer strategy combined with a single bed to simulate the effect of changing gas concentrations entering and exiting the adsorbent bed. A PSA system 100 with two beds is shown in FIG. 19 with an adsorption cycle (bed interaction scheme) as shown in FIG. 20. Feed gas 101 is introduced into line 106 having block valves 105 therein. Line 106 connects the inlet ends 108A and 109A of adsorption columns 108 and 109, respectively. Line 107 also connects the inlet ends 108A and 109A of adsorption columns 108 and 109, respectively, and has an outlet for tail gas 110. Adsorption columns 108 and 109 have product ends 108B and 109B, respectively. Product ends 108B and 109B are connected by lines 111 and 112. Lines 111 and 112 include block valves 105. Line 112 is connected with line 113 which delivers gas to product gas buffer tank 114. The product gas buffer tank 114 allows controlled purging and repressurization steps. Product gas 115 can be provided from product gas buffer tank 114 (controlled by a block valve 105) through line 116 to line 111. Initial PSA simulations for Na-SSZ-13 showed maximum recoveries of $CH_4$ and $C_2H_6$ to be 65% and 25%, respectively, when using two bed PSA cycle.

An adsorption cycle utilizing four beds is summarized in FIG. 21 and is the basis of the PSA process examined in this Example, showing an improvement over the two bed process. The cross hatch patterns shown in the matrix indicates which steps are interacting with each other in separate beds in the integrated cycle in the simulation and where data storage is utilized. Different beds showing the same cross-hatch pattern are thus interacting with each other. The total cycle time in this Example was fixed at 800 s with the adsorption time fixed at 200 s. By having the adsorption time at ¼th of the total cycle time, a continuous production of natural gas may be expected during operation. The three operational parameters examined in this Example are the effects of: Providing Purge-to-Feed molar ratio (PP/F), blowdown and purge pressures (Vacuum Level and Power), and the feed pressure ($P_f$).

The three parameters used to assess the cyclic performance for each adsorbent are:

$$CO_2 \text{ Content} = \frac{\int_0^{t_{ADS}} C_{CO_2} u \big|_{z=l} dt}{\sum \int_0^{t_{ADS}} C_i u \big|_{z=l} dt} \quad (7)$$

$$CH_4 \text{ Recovery} = \frac{\int_0^{t_{ADS}} C_{CH_4} u \big|_{z=l} - \int_0^{t_{RP}} C_{CH_4} u \big|_{z=l}}{\int_0^{t_{ADS}} C_{CH_4} u \big|_{z=0}} \quad (8)$$

$$C_2H_6 \text{ Recovery} = \frac{\int_0^{t_{ADS}} C_{C_2H_6} u \big|_{z=l} - \int_0^{t_{RP}} C_{C_2H_6} u \big|_{z=l}}{\int_0^{t_{ADS}} C_{C_2H_6} u \big|_{z=0}} \quad (9)$$

where the integral represents the time-averaged moles consumed or produced for each component. The target $CO_2$ content for this Example is U.S. pipeline specification, 2 mol % $CO_2$. The vacuum power required to obtain the desired blowdown and purge pressures ($P_{des}$) is estimated by assuming isentropic expansion according to equation (10).

$$\text{Power} = \left( \sum \int_0^{t_{BD}+t_{PU}} C_i u \big|_{z=0} dt \right) \left( \frac{\pi}{4} d_i^2 \right) \frac{k}{k-1} \frac{RT}{\eta} \left[ \left( \frac{1.01325}{P_{des}} \right)^{\frac{k-1}{k}} - 1 \right] \quad (10)$$

where k is the polytropic expansion term, assumed to be 1.5 for natural gas and η is the vacuum efficiency, assumed to be 75%. The feed gas is assumed to be already at its feed pressure, requiring no additional compression, and therefore, the majority of electricity costs would be to power the vacuum pump to reach the desired $P_{des}$.

TABLE 2

| Column Properties | |
| --- | --- |
| Column Length (m) | 2.69 |
| Column Internal Diameter (m) | 0.9 |
| Bed Void Fraction, $\epsilon_p$ | 0.3 |
| Adsorbent Parameters | |
| Bulk Density (kg/m³) | 700 |
| Intraparticle Void Fraction, $\epsilon_i$ | 0.4 |
| Adsorbent Heat Capacity, $C_{p,s}$ (J/kg/K) | 920 |
| Adsorbent Thermal Conductivity, $k_s$ (W/m/K) | 0.4 |
| Pellet Diameter (mm) | 2.0 |
| Tortuosity, τ | 2.2 |
| Operating Conditions | |
| $P_{feed}$ (bar) | 7.9 to 35 |
| $P_{des}$ (bar) | 1.0 to 0.05 |
| $T_{feed}$ (° C.) | 30 |
| $Q_{feed}$ (MM SCFD) | 1.0 to 4.0 |
| Feed Composition, $y_{CH4}/y_{CO2}/y_{C2H6}$ | 0.85/0.10/0.05 |
| Initial Composition, $y_{CH4}/y_{CO2}/y_{C2H6}$ | 0.85/0.10/0.05 |

Figure 23:
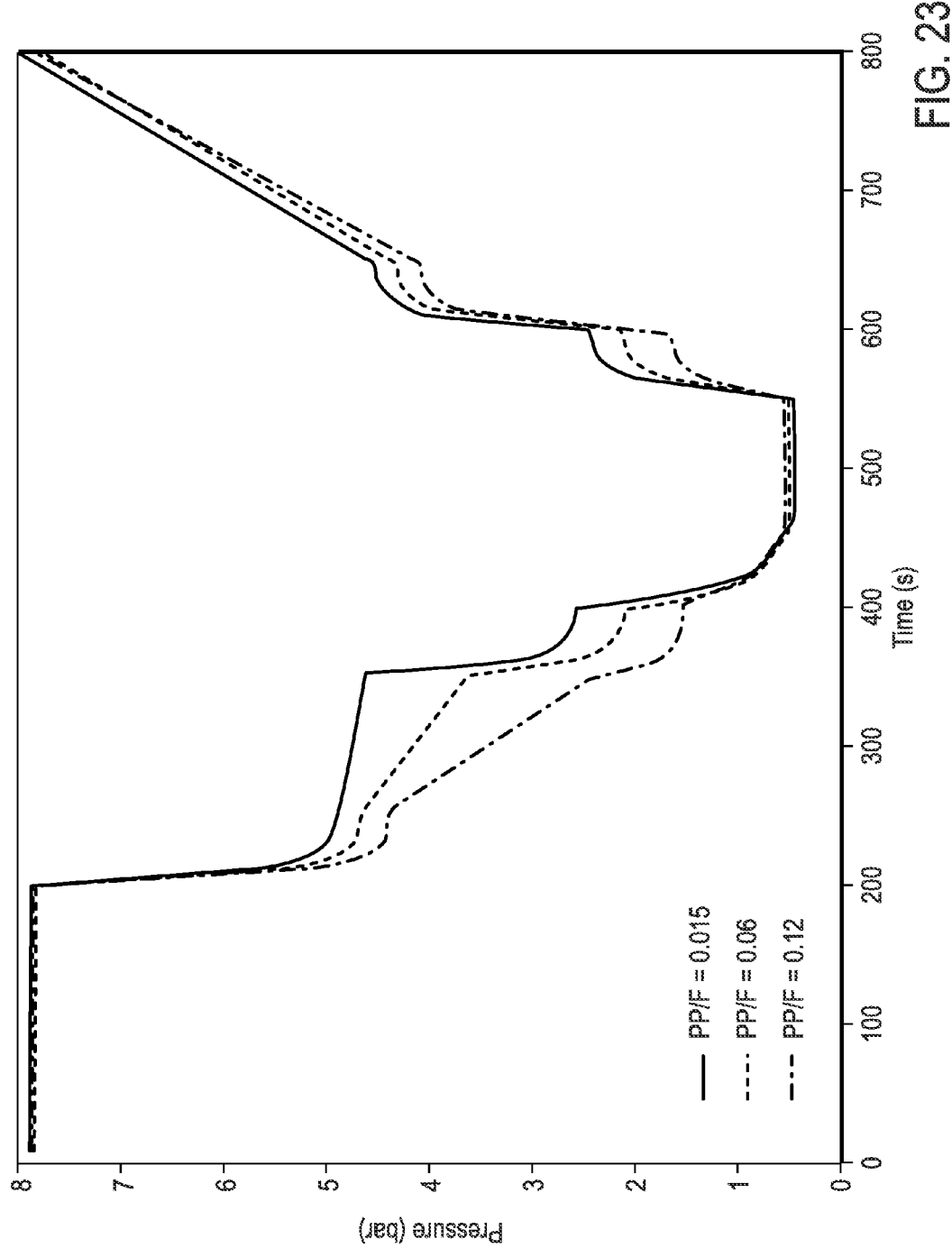
FIG. 23 is a plot of pressure vs. time at different PP/F ratios, according to exemplary embodiments.
Figure 24:
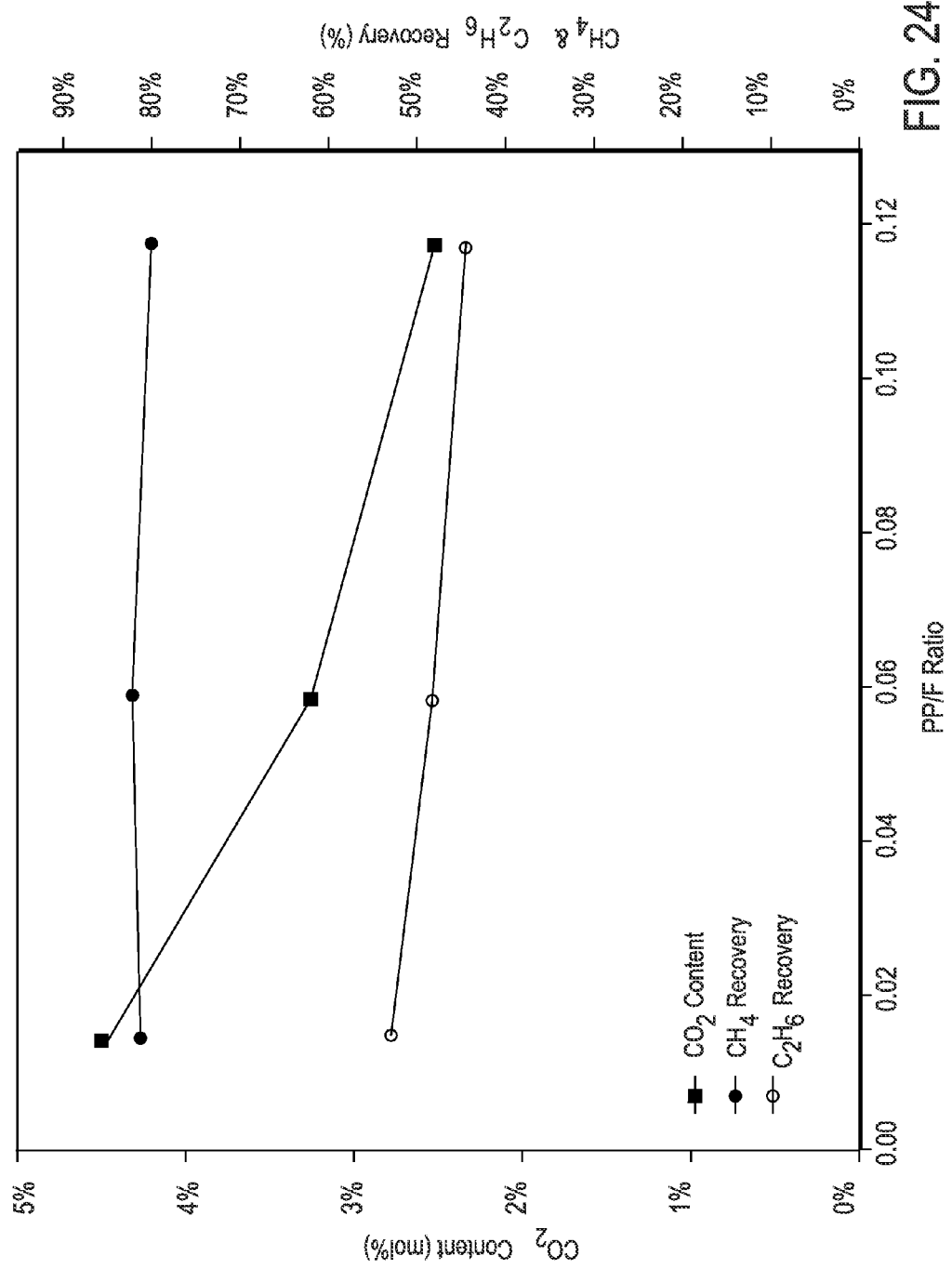
FIG. 24 is a plot of $CO_2$ content in the product gas and recovery of hydrocarbons vs. PP/F ratio using Na-SSZ-13, according to exemplary embodiments.

The first set of simulations examined the effect of increasing the molar PP/F ratio while maintaining a vacuum pressure of 0.35 bar for the blowdown (BD) and purge (PU) steps. It has been shown with equilibrium theory that as the amount of purge gas is increased the adsorbent bed approaches complete clean up under ideal conditions as described in D. M. Ruthven, S. Farooq, K. S. Knaebel, *Pressure Swing Adsorption*, John Wiley & Sons, Inc.: New York, 1994. Therefore, as the PP/F ratio is increased, it is expected that the amount of $CO_2$ removed will increase, therefore decreasing the $CO_2$ content in the product gas. It should also be noted that because the second equalization step occurs after the providing purge (PP) step, the amount of product recovery is affected by the increasing PP/F ratio. FIG. 22 shows the pressure history with different PP/F ratios, showing less pressure recovery from the second equalization step. As this ratio is increased, the amount of gas utilized in the second equalization step decreases, and the subsequent repressurization step requires more product gas in order to reach the same final pressure; however, because the initial PP/F ratio examined is very low (PP/F=0.015), the $CH_4$ recovery does not change greatly as it is first increased as shown in FIG. 23 for Na-SSZ-13. FIG. 23 shows the effect of PP/F ratio on $CO_2$ content in the product gas and recovery of hydrocarbons in Na-SSZ-13. As the PP/F increases, the hydrocarbon recovery decreases, and at the given vacuum pressure of 0.35 bar, only 2.5 mol % $CO_2$ content is achieved in the product with 45% $C_2H_6$ recovery in the product gas. Increasing initial PP/F ratio further does show a decrease in $CH_4$ recovery of approximately 2%. To provide a comparative example to the Na-SSZ-13 in this invention, Na-13X, a commonly studied adsorbent material, was examined under the exact process conditions as Na-SSZ-13. FIG. 24 shows the effect of PP/F ratio on $CO_2$ content in the product gas and recovery of hydrocarbons in Na-13X, a comparative example. In FIG. 24, the $CO_2$ content in the product gas and the $C_2H_6$ recovery in the product gas are shown for increasing purge ratio. As the PP/F increases, the hydrocarbon recovery decreases, and at the given vacuum pressure of 0.35 bar, only 3% $CO_2$ content is achieved in the product with 25% $C_2H_6$ recovery in product gas. Due to the typical adsorption properties that Na-13X exhibits regarding co-adsorption of $C_2H_6$, there is a continuous decrease in the $C_2H_6$ recovery as the purge ratio is increased. Compared with Na-SSZ-13, the Na-13X adsorbent shows inferior removal of $CO_2$ and lower recovery of heavier hydrocarbons such as $C_2H_6$.

Figure 25:
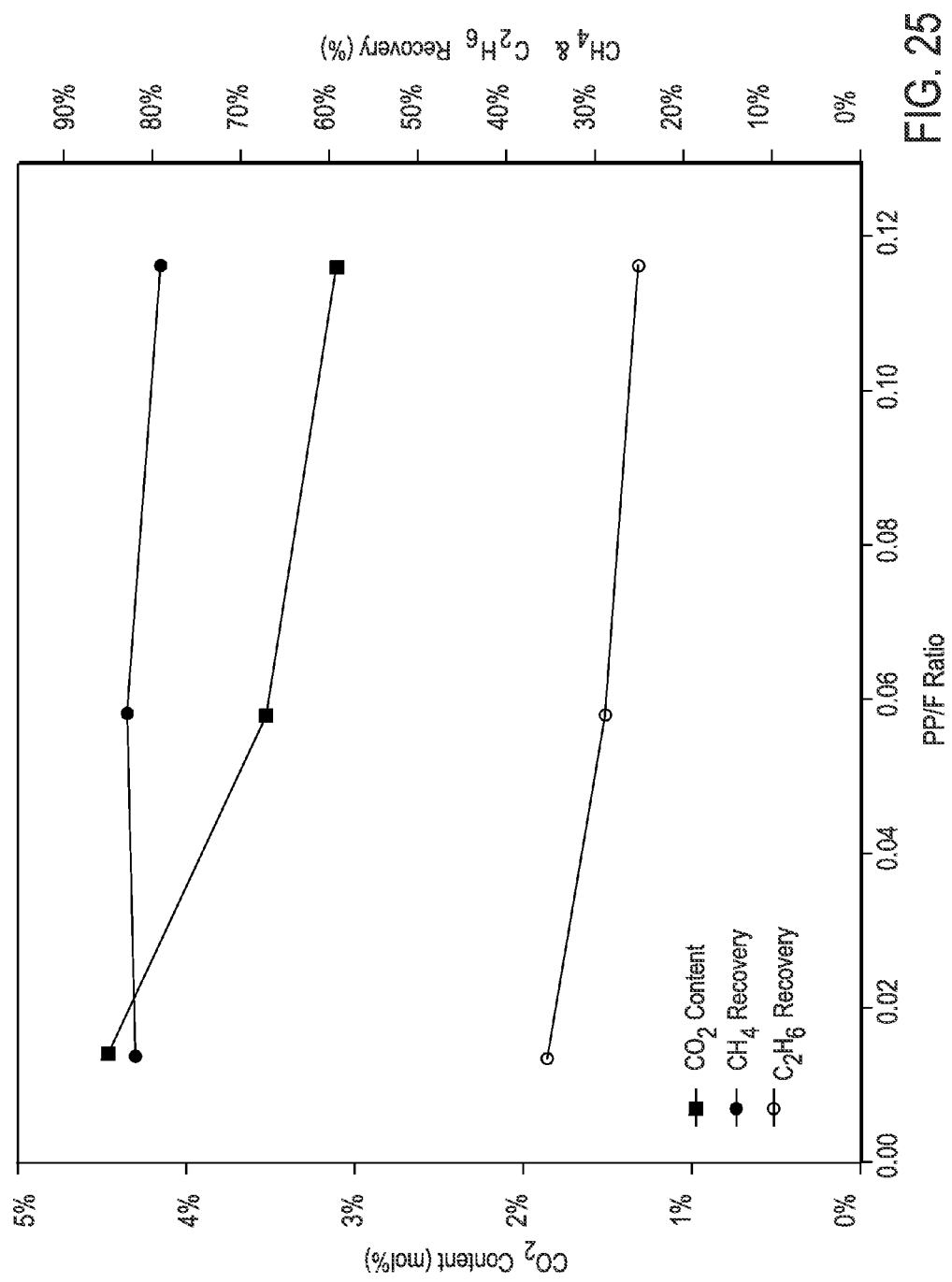
FIG. 25 is a plot of $CO_2$ content in the product gas and recovery of hydrocarbons vs. PP/F ratio using Na-13X, a comparative example.
Figure 26:
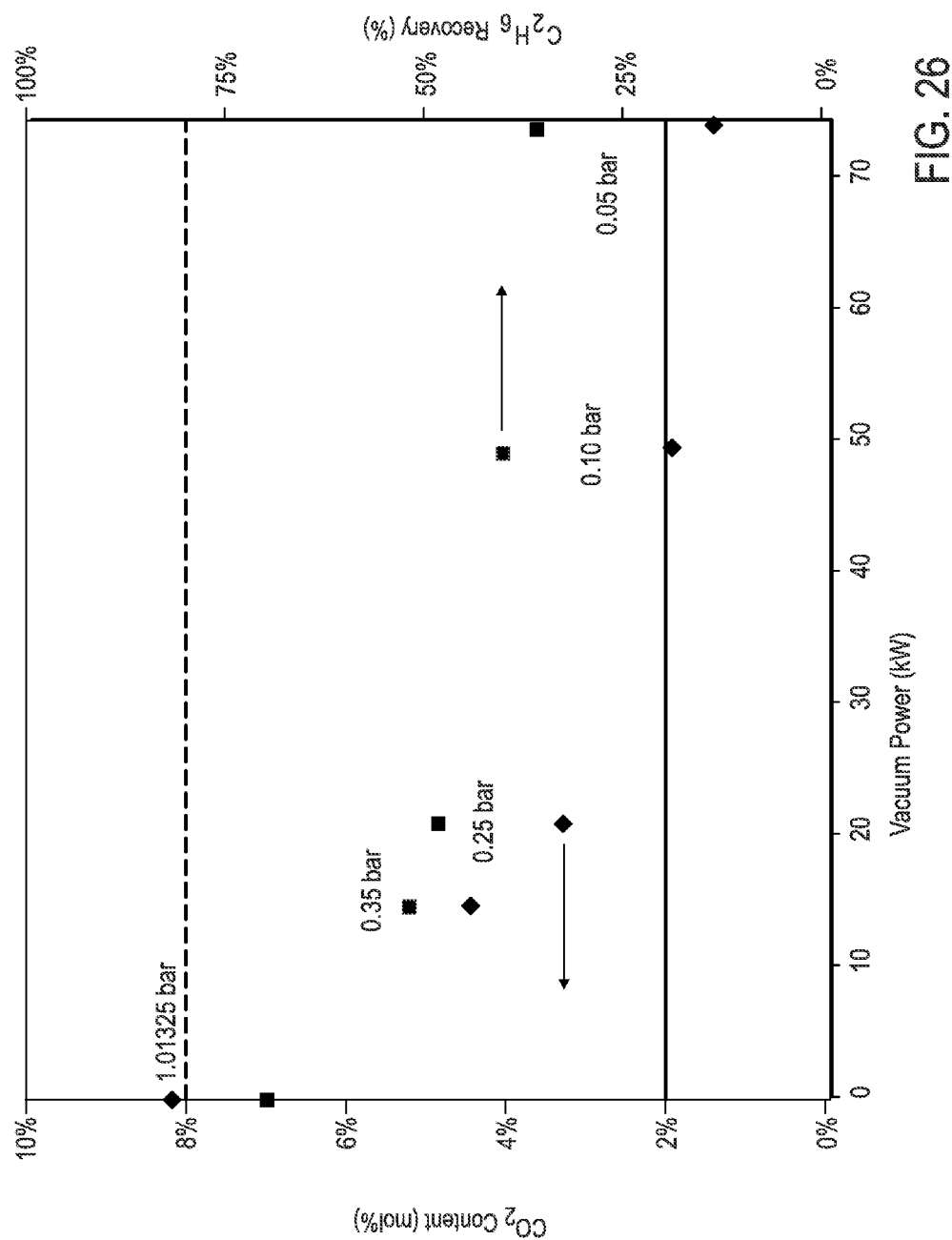
FIG. 26 is a plot of $CO_2$ content in the product gas and $C_2H_6$ recovery vs. vacuum power using Na-SSZ-13, according to exemplary embodiments.

The next set of PSA simulations examined the effect of vacuum pressure on the recovery of hydrocarbons and removal of $CO_2$. FIG. 25 shows the change in $C_2H_6$ recovery and $CO_2$ content in the product gas when Na-SSZ-13 is used as the adsorbent with increasing vacuum power (decreasing vacuum pressure) applied during the blowdown and purge steps with a constant PP/F ratio of 0.015. $CH_4$ recovery was roughly constant at 80%. At this PP/F ratio, the pipeline specification for $CO_2$ is not met unless a vacuum pressure of 0.10 bar is applied during the purging steps. This equates to approximately 50 kW of electricity for 1 MM SCFD feed, or 1200 kW·hr/MM SCF raw gas feed to the PSA unit in the case of Na-SSZ-13. This is approximately the same required power consumption needed to operate an amine absorption unit and is slightly below what is expected for a typical PSA unit as described in F. Bauer, T. Persson, C. Hulteberg, D. Tamm, "Biogas Upgrading—Technology Overview, Comparison and Perspectives for the Future", *Biofuels Bioprod. Biorefining*, 2013, 7, 499-511. Another observation of increasing the vacuum level is that the $C_2H_6$ recovery does not decrease greatly beyond a vacuum pressure of 0.10 bar when Na-SSZ-13 is the adsorbent. At the lowest vacuum pressure of 0.05 bar, the $C_2H_6$ recovery for Na-SSZ-13 is 37%. This again contrasts the effects that the $C_2H_6$ adsorption properties, and other heavier hydrocarbons, have on the adsorbent performance. As shown in FIG. 26, when Na-13X was studied under these same conditions, there is significantly less $C_2H_6$ recovered in the product gas compared to Na-SSZ-13.

Figure 27:
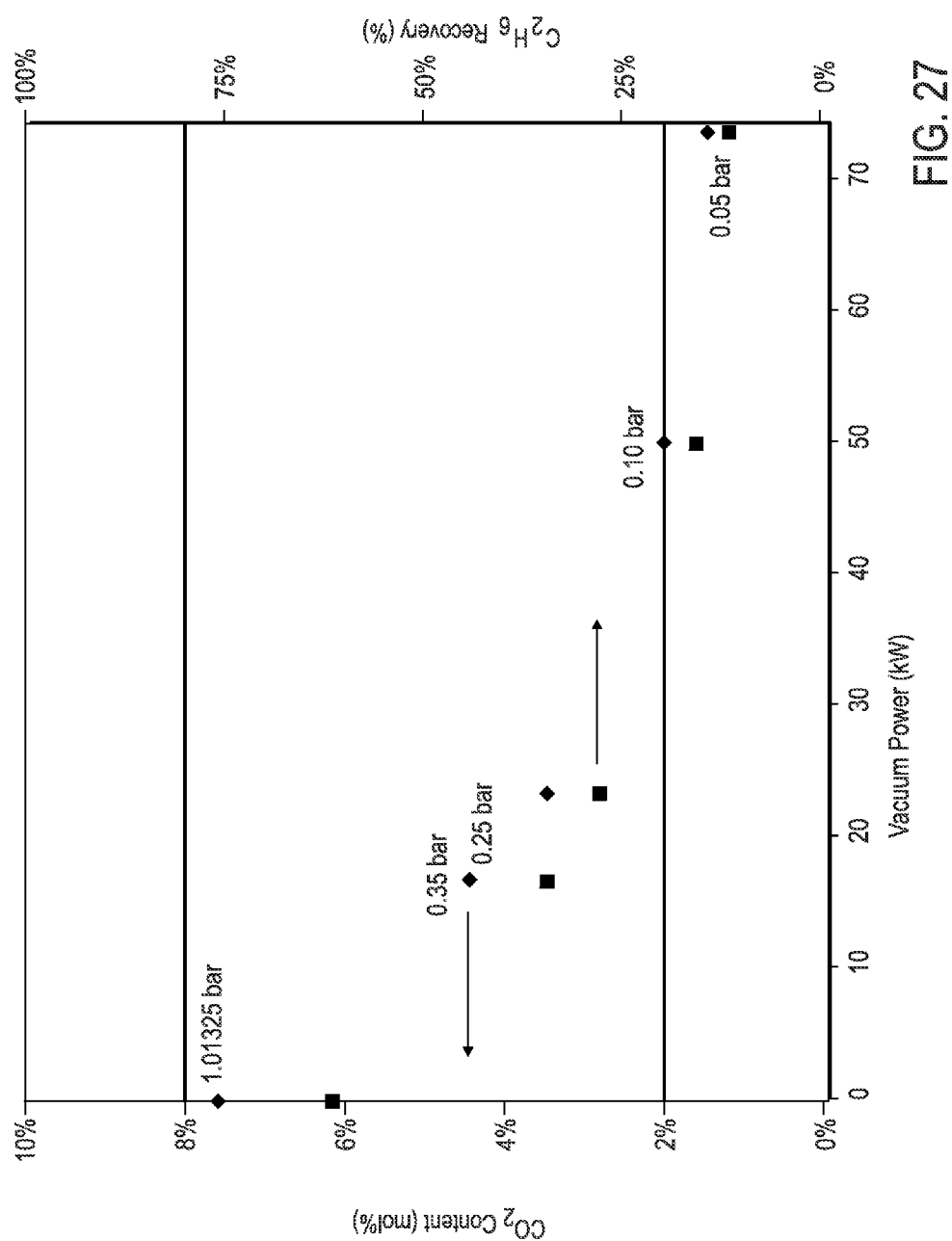
FIG. 27 is a plot of $CO_2$ content in the product gas and $C_2H_6$ recovery vs. vacuum power using Na-13X.
Figure 28:
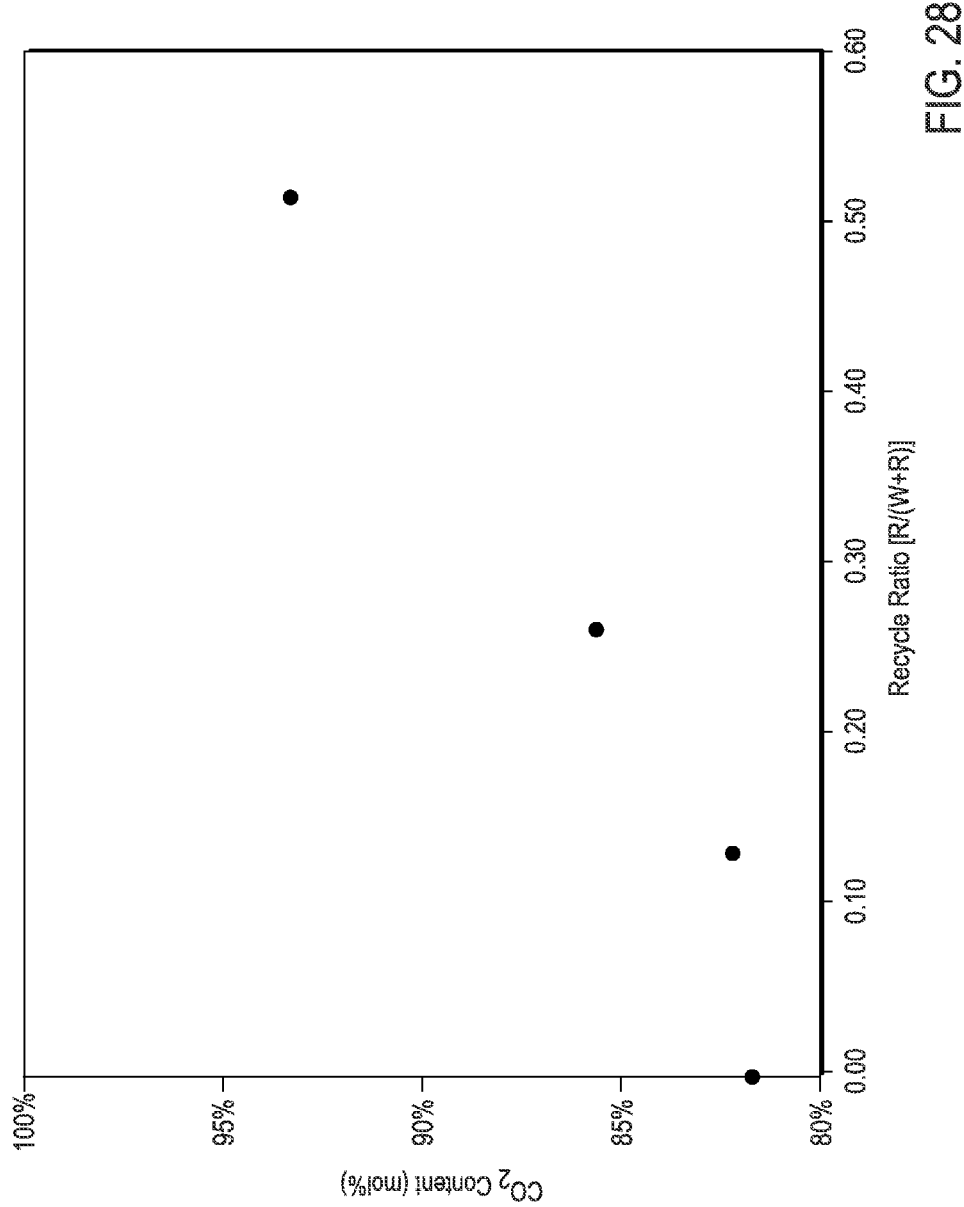
FIG. 28 is a plot of $CH_4$ recovery vs. recycle ratio, according to exemplary embodiments.
Figure 29:
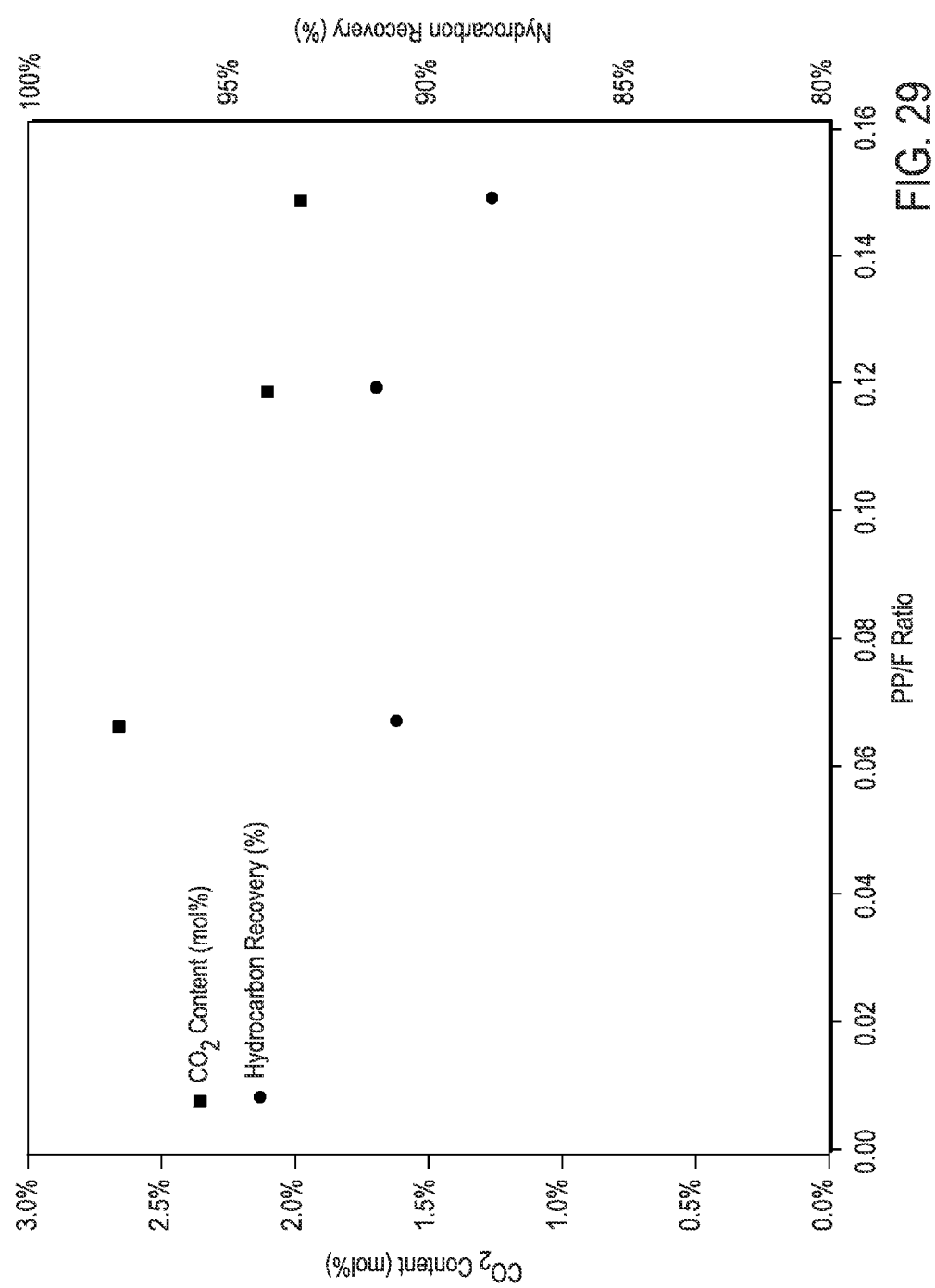
FIG. 29 is a plot of $CO_2$ content in the product gas and percent recovery of hydrocarbons vs. the PP/F ratio, according to exemplary embodiments.

The effect of recycling a fraction of the tail gas back to the feed gas was considered. FIG. 27 shows the effect of the recycle ratio, defined as the fraction of tail gas recycled to the feed gas, on the amount of $CH_4$ recovery while operating at 7.9 bar feed pressure and 0.35 bar vacuum pressure. When 50% of the tail gas is recycled to the feed, it was found that the $CH_4$ recovery increases from 82% to 93%. While a 10% increase in gas recovery would correlate directly with an increase in revenue, the added cost of compression for the recycle stream is also an important consideration. Because the vacuum pressure is increased compared to the "no recycle" case above and there is not a significantly large recycle stream, the added compression requirements do not raise the overall electricity requirements. However, the simulation results in FIG. 27 do not consider the pipeline specification for $CO_2$. This is highlighted in FIG. 28, which maintains a constant recycle ratio of 50% and a vacuum pressure of 0.35 bar, while changing the PP/F ratio. Increasing purge gas removes more $CO_2$ content in product gas to reach target pipeline specifications. To reach a pipeline specification, roughly 15% PP/F is required, lowering the expected total hydrocarbon recovery to 88%. Conversely, there is a reduction in the expected electricity requirements to reach 2 mol % $CO_2$ in the product, decreasing from 1200 to 700 kW·hr/MM SCF raw gas. This electricity takes into account both the vacuum required for the tail gas and the recompression of the recycled tail gas to the feed.

Zeolites 13X and SSZ-13 have been examined for their equilibrium and dynamic adsorption properties for $CO_2$, $CH_4$, and $C_2H_6$, three of the major components commonly found in natural gas. Because SSZ-13 shows promising results in these ternary gas mixtures, the zeolite has been studied in gas mixtures containing $H_2S$, a common contaminant found in natural gas wells. Advantageously, the use of SSZ-13 results in only 10% or less loss of $CO_2$ separation capacity when $H_2S$ is included in gas mixture feeds. The dynamic adsorption experiments included herein were modeled taking into account simultaneous solutions of momentum, mass and heat balances. The PSA modeling herein shows that SSZ-13 has significantly higher $C_2H_6$ recovery in comparison to 13X with comparable recovery of $CH_4$ and more favorable removal of $CO_2$ at similar feed conditions. Without wishing to be limited by theory, it is believed that the unique adsorption properties of $C_2H_6$ on Na-SSZ-13 allow for higher recovery due to adsorption of $C_2H_6$ occurring during the blowdown and purge steps, recovering some of the $C_2H_6$ that would be typically lost during adsorbent regeneration.

It has been found that under certain conditions the recovery of $CH_4$ and $C_2H_6$ are 81% and 41%, respectively, while meeting a $CO_2$ specification of 2 mol % in the product stream. The estimated power consumption from this process based on the required vacuum level is 1200 kW*hr/(MM SCFD raw gas).

It has been found that adding a recycle of the waste stream from the blowdown and purge steps would increase the predicted $CH_4$ and $C_2H_6$ recoveries to 91% and 45%, respectively. This would also effectively lower the vacuum and compression costs to 700 kW*hr/(MM SCFD raw gas). This process may be used for removing acid gases from natural gas streams in remote or off-shore locations if amine absorption is not a viable alternative for separations.

The present disclosure provides a process to separate natural gas products from acid gases without the need for solvent regeneration or dehydration processes. The reduction in process complexity enables gas processing in remote or off-shore locations where natural gas may contain significant amounts of acid gases by reducing multiple solvent-based process units to a more compact adsorbent-based process unit. In addition, the zeolite SSZ-13 adsorbent PSA simulations predict a substantially higher recovery of hydrocarbons and a 25% reduction in required power consumption when no recycle stream is used compared to existing commercial technologies for PSA processes.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A method for removing an acid gas from a feed gas stream of a natural gas including the acid gas, a methane and an ethane, comprising:
    alternating input of the feed gas stream between at least two beds of adsorbent particles made from a homogeneous mixture comprising a zeolite SSZ-13 such that the feed gas stream contacts one of the at least two beds at a given time in an adsorption step and a tail gas stream is simultaneously vented from another of the at least two beds in a desorption step;
    wherein a contacting of the feed gas stream occurs at a feed pressure of from about 50 to about 1000 psia for a sufficient period of time to preferentially adsorb the acid gas from the feed gas stream; thereby producing a product gas stream containing no greater than about 2 mol % carbon dioxide and at least about 65 mol % of the methane recovered from the feed gas stream and at least about 25 mol % of the ethane recovered from the feed gas stream; and
    wherein the feed gas stream is input at a feed end of each of the at least two beds; the product gas stream is removed from a product end of each of the at least two beds; and the tail gas stream is vented from the feed end of each of the at least two beds.

2. The method of claim 1, wherein the at least two beds of adsorbent particles comprising the zeolite SSZ-13 are four beds of adsorbent particles comprising the zeolite SSZ-13; and wherein the product gas stream contains at least about 80 mol % of the methane recovered from the feed gas stream and at least about 40 mol % of the ethane recovered from the feed gas stream.

3. The method of claim 1, wherein the acid gas adsorbed from the feed gas stream comprises the carbon dioxide and from 0 to 1000 ppm hydrogen sulfide.

4. The method of claim 1, wherein the zeolite SSZ-13 has a Si:Al ratio of from 5 to 100.

5. The method of claim 1, wherein the feed gas stream has a flow rate of from 1 to 100 MMSCFD in the adsorption step and the adsorption step occurs at a temperature of from 20 to 80° C.

6. The method of claim 1, wherein the product gas stream contains the methane having a purity of at least about 95 mol % of the methane and contains the ethane having the purity of at least about 3 mol % of the ethane.

7. The method of claim 1, wherein the product gas stream contains no greater than about 50 ppm hydrogen sulfide.

8. The method of claim 1, wherein the product gas stream contains no greater than about 4 ppm hydrogen sulfide.

9. The method of claim 1, wherein the zeolite SSZ-13 has a cation as a framework ion selected from the group consisting of sodium, calcium, potassium, lithium, magnesium, and barium.

10. The method of claim 1, wherein the zeolite SSZ-13 has sodium as a framework ion.

11. The method of claim 1, wherein the acid gas is a gas selected from the group consisting of the carbon dioxide, hydrogen sulfide, carbonyl sulfide, combinations thereof, and combinations thereof with water.

12. The method of claim 1, wherein the method utilizes two beds of adsorbent particles comprising the zeolite SSZ-13 and further comprising:
    a. following the adsorption step in one of the two beds and simultaneous other desorption step in the other of the two beds, equalizing pressure of the two beds through the product end of each of the two beds at an end of the adsorption step and simultaneous other desorption step; and
    b. repressurizing the one of the two beds having just completed the desorption step by sending a slipstream of the product gas stream through the product end of the one of the two beds having just completed the desorption step.

13. A method for removing an acid gas from a feed gas stream of a natural gas including the acid gas, a methane and an ethane, comprising:
    alternating input of the feed gas stream between at least two beds of adsorbent particles comprising a zeolite SSZ-13 such that the feed gas stream contacts one of the at least two beds at a given time in an adsorption step and a tail gas stream is simultaneously vented from another of the at least two beds in a desorption step;
    wherein the at least two beds of adsorbent particles comprising the zeolite SSZ-13 are four beds of adsorbent particles comprising the zeolite SSZ-13,
    wherein a contacting of the feed gas stream occurs at a feed pressure of from about 50 to about 1000 psia for a sufficient period of time to preferentially adsorb the acid as from the feed as stream; thereby producing a product as stream containing no greater than about 2 mol % carbon dioxide and at least about 65 mol % of the methane recovered from the feed gas stream and at least about 25 mol % of the ethane recovered from the feed gas stream; and
    wherein the feed gas stream is input at a feed end of each of the at least two beds; the product gas stream is removed from a product end of each of the at least two beds; and the tail gas stream is vented from the feed end of each of the at least two beds;
    further comprising:
    a. following a first adsorption step in a first bed of the four beds, a first equalization step occurs wherein the first bed is allowed to equalize in a pressure with a second bed of the four beds having a lower pressure than the first bed through a first line connecting the product ends of the first bed and the product end of the second bed;
    b. following the first equalization step, lowering the pressure in the first bed and passing a gas from the first bed to a third bed of the four beds through a second line connecting the product ends of the first bed and the product end of the third bed in a providing purge step such that the third bed of the four beds is purged;

c. following the providing purge step, a second equalization step occurs wherein the first bed is allowed to equalize in the pressure with the third bed of the four beds having the lower pressure than the first bed through a third line connecting the product ends of the first bed and the product end of the third bed;

d. following the second equalization step, depressurizing a first adsorbent bed to the pressure from about 20 to about 1 psia through the feed end of the first adsorbent bed in a blowdown step comprising either:
  i. allowing the gas in the first adsorbent bed to vent to a purge tank; or
  ii. using a vacuum pump to lower the pressure of the first adsorbent bed;

e. following the blowdown step, the first bed is purged in a purging step wherein the gas is provided to the first bed through the product end of the first bed from a fourth bed of the four beds while the first bed is at the pressure from about 20 to about 1 psia and the gas is purged through the feed end of the first bed;

f. following the purging step, a third equalization step occurs wherein the first bed is allowed to equalize in the pressure with the fourth bed having a higher pressure than the first bed through a fourth line connecting the product ends of the first bed and the product end of the fourth beds;

g. following the third equalization step, a fourth equalization step occurs wherein the first bed is allowed to equalize with the second bed having the higher pressure than the first bed through a fifth line connecting the product ends of the first bed and the product end of the second bed;

h. following the fourth equalization step, passing a slip-stream of the product gas stream or a stream of gas from a storage tank through the product end of the first bed to repressurize the first bed to an adsorption step pressure in a repressurization step; and i. following the repressurization step, operating the first bed in an independent adsorption step for sufficient time for the third bed and the fourth beds to be equalized in the pressure and the second bed to be depressurized prior to beginning a second adsorption step;

wherein the second bed, the third bed, and the fourth beds are sequenced to cycle through the adsorption step, the first equalization step, the providing purge step, the second equalization step, the blowdown step, the purging step, the third equalization step, the fourth equalization step and the independent adsorption step in the same order as the first bed.

14. The method of claim 13, wherein the adsorption step, the first equalization step, the providing purge step, the second equalization step, the blowdown step, the purging step, the third equalization step, the fourth equalization step and the independent adsorption step occur in a total cycle time of from 400 to 3600 seconds.

15. The method of claim 1, wherein the method is performed on an offshore platform.

16. The method of claim 1, wherein the method has a specific vacuum power consumption of from about 500 to about 1500 kWhr/MM SCF raw gas.

17. The method of claim 1, wherein from greater than 0% to about 50% of the tail gas stream is recycled to the feed gas stream; thereby producing the product gas stream containing at least about 90 mol % of the methane in the feed gas stream and at least about 85 mol % of a total hydrocarbons in the feed gas stream.

18. A method for removing an acid gas from a feed gas stream of natural gas including a methane, an ethane, a carbon dioxide and from 4 to 1000 ppm hydrogen sulfide, comprising:

alternating input of the feed gas stream of natural gas between at least two beds of adsorbent particles made from a homogeneous mixture comprising zeolite SSZ-13 such that the feed gas stream of natural as contacts one of the at least two beds at a given time in an adsorption step and a tail gas stream is simultaneously vented from another of the at least two beds in a desorption step;

wherein a contacting of the feed gas stream of natural gas the contact occurs at a feed pressure of from about 50 to about 1000 psia for a sufficient period of time to preferentially adsorb the acid gas from the feed gas stream of natural gas; thereby producing a product gas stream containing no greater than about 2 mol % of the carbon dioxide, no greater than about 1 ppm H2S, no greater than about 1 ppm COS, and at least about 65 mol % of the methane recovered from the feed gas stream of natural gas and at least about 25 mol % of the ethane recovered from the feed gas stream of natural gas; and wherein the feed gas stream of natural gas is input at a feed end of each of the at least two beds; the product gas stream is removed from a product end of each of the at least two beds; and the tail gas stream is vented from the feed end of each of the at least two beds.

* * * * *